United States Patent
Murray et al.

(10) Patent No.: US 12,433,479 B2
(45) Date of Patent: Oct. 7, 2025

(54) SYSTEMS AND METHODS FOR ARTHROSCOPIC VISUALIZATION

(71) Applicant: Stryker Corporation, Kalamazoo, MI (US)

(72) Inventors: Gavin Michael Murray, Vancouver (CA); Paul Ginzburg, San Diego, CA (US); Levey Tran, Denver, CO (US); Brian Fouts, Morgan Hill, CA (US); Theodore Husby, Toronto (CA); Ben Feingold, San Jose, CA (US); Frederick Allen Moore, Vancouver (CA); Aric Josef Beikmann, San Jose, CA (US); Christopher Robert Miller, Denver, CO (US)

(73) Assignee: Stryker Corporation, Portage, MI (US)

(*) Notice: Subject to any disclaimer, the term of this patent is extended or adjusted under 35 U.S.C. 154(b) by 569 days.

(21) Appl. No.: 17/660,824

(22) Filed: Apr. 26, 2022

(65) Prior Publication Data
US 2022/0338725 A1   Oct. 27, 2022

Related U.S. Application Data

(60) Provisional application No. 63/180,027, filed on Apr. 26, 2021.

(51) Int. Cl.
*A61B 1/317* (2006.01)
*A61B 1/00* (2006.01)
*A61B 17/34* (2006.01)

(52) U.S. Cl.
CPC .......... *A61B 1/317* (2013.01); *A61B 1/00029* (2013.01); *A61B 1/00165* (2013.01); *A61B 17/3421* (2013.01); *A61B 2017/3445* (2013.01)

(58) Field of Classification Search
CPC ............ A61B 1/00016; A61B 1/00029; A61B 1/00068; A61B 1/00094; A61B 1/00096;
(Continued)

(56) References Cited

U.S. PATENT DOCUMENTS 5,785,644 A * 7/1998 Grabover ............. A61B 1/3132
                                                600/109
8,608,648 B2   12/2013 Banik
(Continued)

FOREIGN PATENT DOCUMENTS

WO        2018/165365 A2    9/2018

OTHER PUBLICATIONS

Arthrex (2021) "StarFish Scope Rotation Attachment," located at https://www.arthrex.com/imaging-resection/starfish, (5 pages).
(Continued)

*Primary Examiner* — Michael J Carey
*Assistant Examiner* — Stephen Floyd London
(74) *Attorney, Agent, or Firm* — Morrison & Foerster LLP

(57) ABSTRACT

The present disclosure is directed to arthroscopic visualization systems and methods. The visualization system can include a camera with a fluid inflow path, wherein a proximal end of the camera is configured to fluidly connect a fluid reservoir to the fluid inflow path. The system can also include a cannula with a lumen, wherein the lumen is configured to be fluidly connected to the fluid inflow path at a distal end of the camera. In addition, the system can also include a scope, wherein the scope is configured to be connected to the distal end of the camera and a portion of the scope is configured to be inserted into the lumen of the cannula.

31 Claims, 27 Drawing Sheets

(58) Field of Classification Search
CPC ............ A61B 1/00105; A61B 1/00119; A61B 1/00128; A61B 1/00135; A61B 1/0125; A61B 1/015; A61B 1/018; A61B 1/042; A61B 1/0669; A61B 1/0676; A61B 17/3478; A61B 2017/3433; A61B 2017/3445; A61B 2017/3456; A61B 1/00101; A61M 2025/0037

See application file for complete search history.

(56) References Cited

U.S. PATENT DOCUMENTS

| | | | | |
|---|---|---|---|---|
| 2002/0161279 | A1* | 10/2002 | Luloh | F21V 19/001 600/167 |
| 2006/0229495 | A1* | 10/2006 | Frith | A61B 1/00128 600/112 |
| 2008/0058595 | A1 | 3/2008 | Snoke | |
| 2009/0192355 | A1* | 7/2009 | Mejia | A61B 1/07 600/156 |
| 2009/0253965 | A1* | 10/2009 | Miyamoto | A61B 1/042 600/157 |
| 2014/0343358 | A1 | 11/2014 | Hameed | |
| 2015/0062153 | A1* | 3/2015 | Mihalca | H04N 1/6008 345/604 |
| 2015/0105620 | A1* | 4/2015 | Oginski | G02B 23/2453 600/112 |
| 2015/0150441 | A1 | 6/2015 | Ouyang | |
| 2016/0038013 | A1* | 2/2016 | Czupalla | A61B 1/00142 128/849 |
| 2017/0035277 | A1 | 2/2017 | Kucharski | |
| 2017/0055811 | A1* | 3/2017 | Germain | A61B 18/1482 |
| 2017/0265879 | A1* | 9/2017 | Washburn, II | A61B 8/12 |
| 2019/0246884 | A1 | 8/2019 | Lu | |
| 2019/0321077 | A1* | 10/2019 | Kienzle | A61B 17/3478 |
| 2020/0268236 | A1* | 8/2020 | Chiba | A61B 1/00194 |
| 2022/0087520 | A1* | 3/2022 | Ahn | A61B 1/042 |
| 2022/0110674 | A1* | 4/2022 | Taylor | A61B 18/1485 |
| 2022/0142463 | A1* | 5/2022 | Altshuler | A61B 18/22 |
| 2022/0304559 | A1* | 9/2022 | Weeks | A61B 1/0655 |

OTHER PUBLICATIONS

Firefly. (2022) located at: https://fireflyglobal.com/es201-compact-led-light-source/, (4 pages).

International Preliminary Report on Patentability dated Oct. 24, 2023, directed to International Application No. PCT/US2022/071936; 11 pages.

International Search Report and Written Opinion mailed Aug. 30, 2022, directed to International Application No. PCT/US2022/071936; 20 pages.

Invitation to Pay Additional Fees, and Where Applicable, Protest Fee mailed Jul. 6, 2022, directed to International Application No. PCT/US2022/071936; 12 pages.

Karl Storz (Nov. 2017) "Light Sources: Optimal Lighting for Industrial Endoscopy," located at https://www.karlstorz.com/cps/rde/xbcr/karlstorz_assets/ASSETS/2974490.pdf, (28 pages).

* cited by examiner

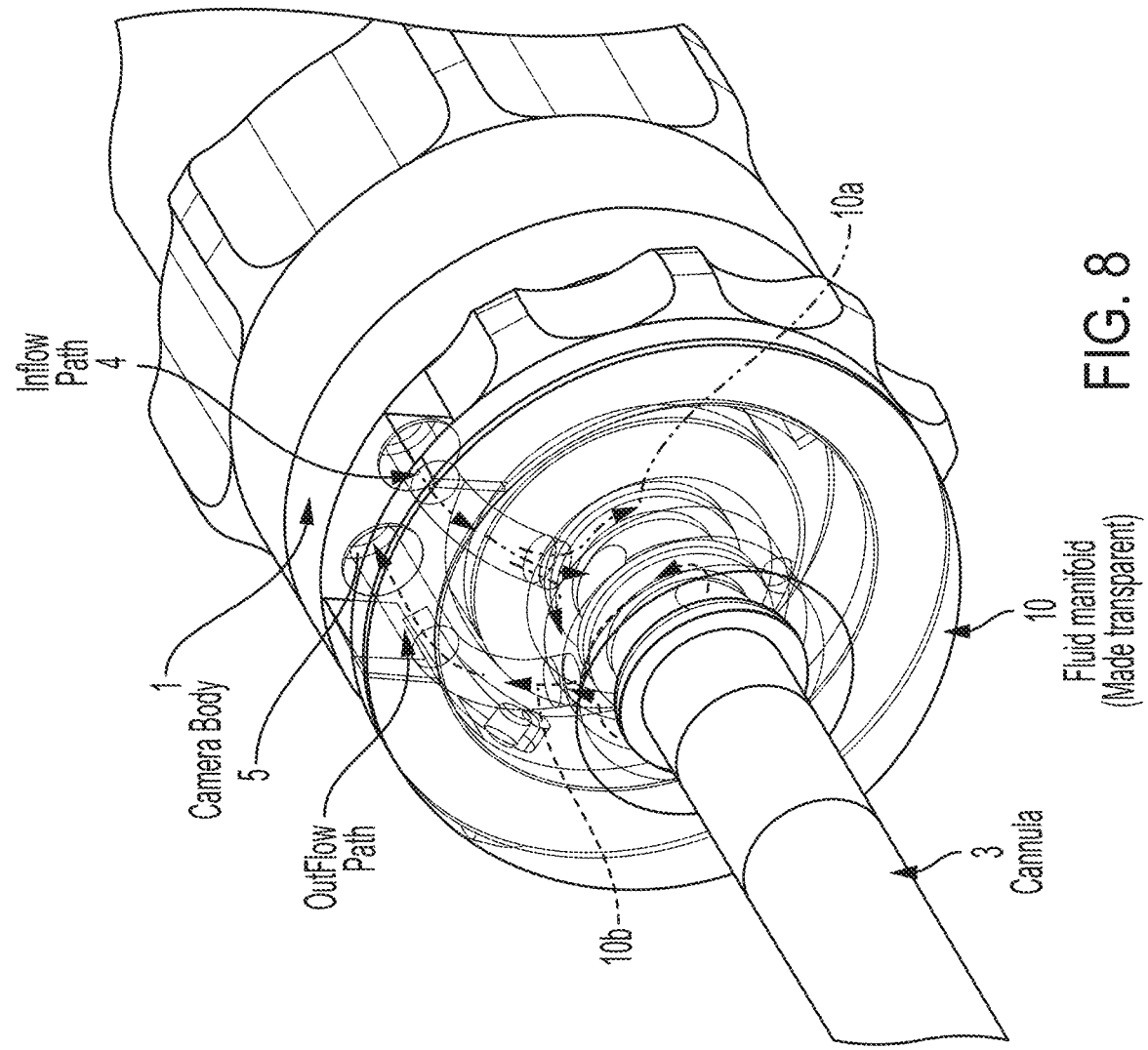

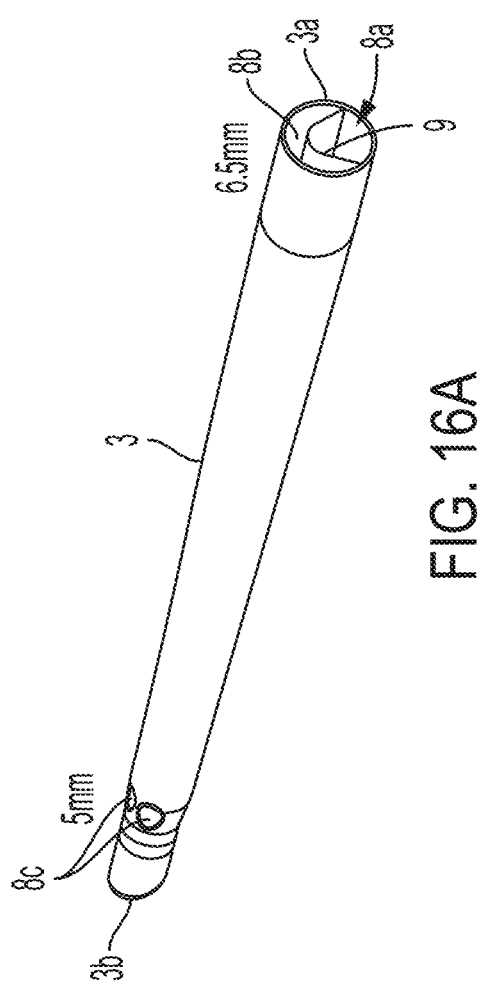
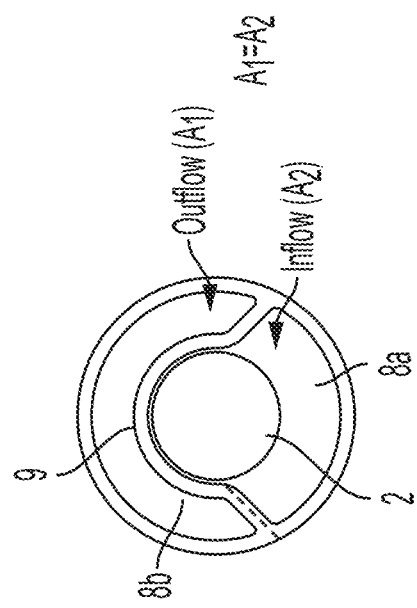
FIG. 16A
FIG. 16B

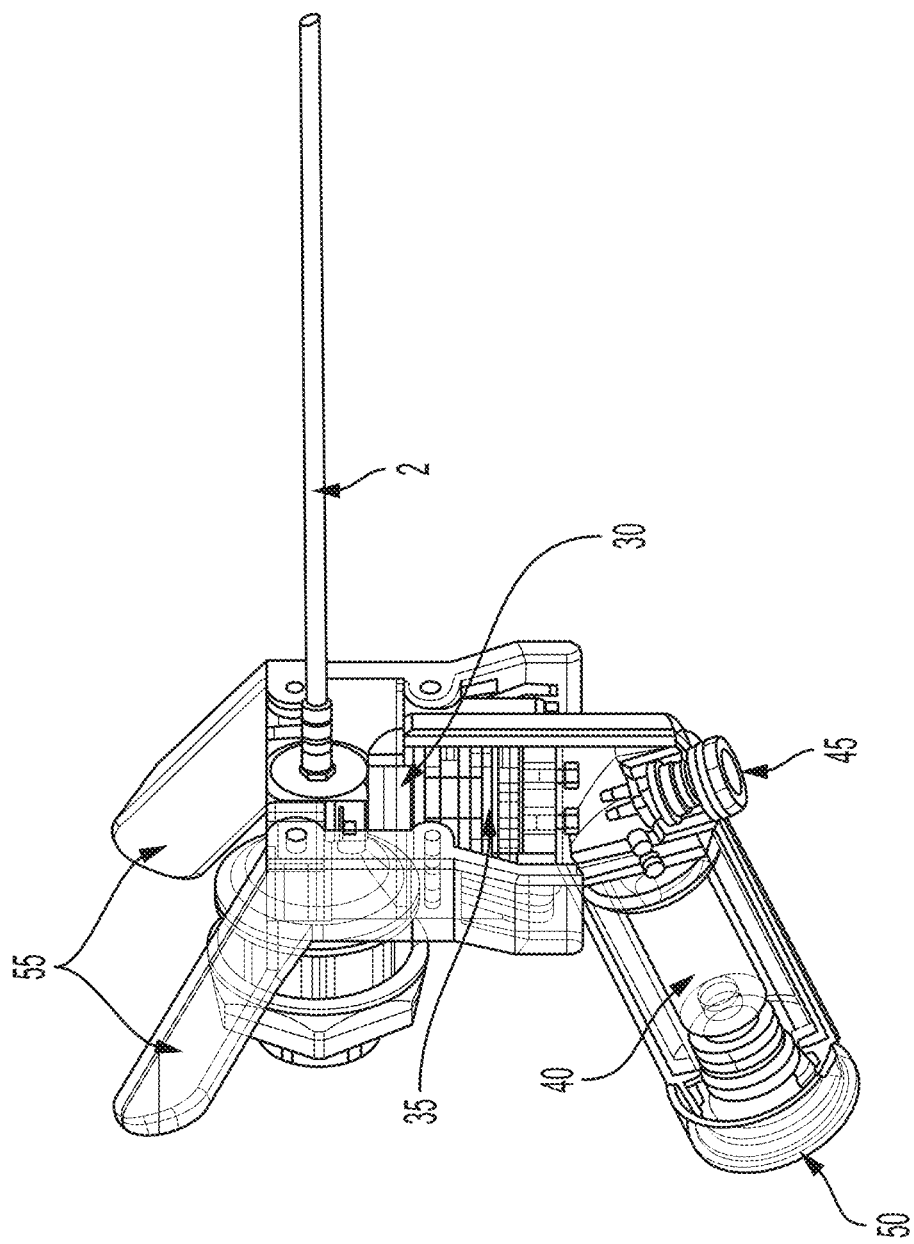

SYSTEMS AND METHODS FOR ARTHROSCOPIC VISUALIZATION

CROSS-REFERENCE TO RELATED APPLICATIONS

This application claims the benefit of U.S. Provisional Application No. 63/180,027, filed Apr. 26, 2021, the entire contents of which are hereby incorporated by reference herein.

FIELD

This disclosure relates generally to visualization systems and methods, and more specifically, to arthroscopic systems and methods.

BACKGROUND

Typical endoscopic camera systems require two hands to hold the camera and adjust the direction of view ("DOV") by rotating the scope. In addition, these typical endoscopic camera systems have fiber-optic light guides that attach to the proximal end of the scope near the hand of the user. This clutters the space where the user is manipulating the camera and scope. Furthermore, the weight and stiffness of the light guide hanging off the proximal end of the scope can cause unwanted rotation of the scope relative to the camera head, thereby changing the user's DOV.

Besides light guides, the typical endoscopic camera system also utilizes a cannula design that has stopcocks or other methods for connecting tubing to the proximal end of the cannula/scope connection. Like the light guides, this tubing clutters the space as well as adds additional weight/stiffness to the area where the user is manipulating the camera and scope.

SUMMARY

According to an aspect, a visualization system can include a minimally invasive camera, cannula, and scope system. In some aspects, the visualization systems disclosed herein can enable users to operate the camera with one hand via ergonomic features incorporated into the camera/scope/cannula to provide the ability to rotate the scope direction of view ("DOV") with a single hand while holding the camera. In addition, the visualization systems disclosed herein can be smaller and lighter than their existing counterparts, can reduce or eliminate cables or tubes from the operating zone allowing for greater maneuverability, and the working distance between the hand and the distal tip of the scope can be shorter providing the user with greater control.

In some aspects, the visualization systems disclosed herein can have illumination integrated into the camera and/or scope assembly. This can remove any need for a fiber-optic light guide by incorporating illumination into the camera, cannula, or scope while maintaining the ability to remove and rotate the scope any number of times relative to the camera. In some aspects, the visualization systems can provide wireless power to the scope. This can facilitate scope-integrated electrically-driven light sources and can enable the user of other power-consuming devices inside the scope. In some aspects, the visualization systems can include a fluid management system that reroutes fluid inflow and/or outflow such that fluid inlet/outlet tubing can join the camera assembly alongside a data cable at the proximal end of the camera. In some aspects, the visualization system can include a cannula with a multi-lumen. In addition, the diameter of the cannula can reduce/taper in size from the proximal end to the distal end.

According to some aspects, the visualization systems can include optics to convey light from the target to the image sensor; an image sensor and electrical pathway to send images to a processing unit; an illumination source to illuminate the target; a fluid management system to fill the target area with fluid; a cannula to deliver fluid to the target, and/or a cannula to remove fluid from the target. These elements can be incorporated into the visualization system to improve the ergonomic experience of a user handling the system.

According to an aspect, a visualization system for medical procedures includes a camera comprising a fluid inflow path, wherein a proximal end of the camera is configured to fluidly connect a fluid reservoir to the fluid inflow path; a cannula comprising a lumen, wherein the lumen is configured to be fluidly connected to the fluid inflow path at a distal end of the camera; and a scope, wherein the scope is configured to be connected to the distal end of the camera and a portion of the scope is configured to be inserted into the lumen of the cannula.

According to an aspect, a visualization system for medical procedures comprising: a camera comprising a fluid inflow path and a fluid outflow path, wherein a proximal end of the camera is configured to fluidly connect a fluid reservoir to the fluid inflow path and the fluid outflow path to a fluid waste; a cannula comprising a first and a second lumen, wherein the first lumen is configured to be fluidly connected to the fluid inflow path at a distal end of the camera and the second lumen is configured to be fluidly connected to the fluid outflow path at the distal end of the camera; and a scope, wherein the scope is configured to be connected to the distal end of the camera and a portion of the scope is configured to be inserted into the first or second lumen of the cannula.

According to an aspect, a visualization system for medical procedures comprising: a camera comprising a fluid inflow path, wherein a proximal end of the camera is configured to fluidly connect a fluid reservoir to the fluid inflow path; a cannula comprising a lumen, wherein the lumen is configured to be fluidly connected to the fluid inflow path at a distal end of the camera; and a scope, wherein the scope is configured to be connected to and wirelessly, electrically coupled to the distal end of the camera and a portion of the scope is configured to be inserted into the lumen of the cannula.

According to an aspect, a visualization system for medical procedures comprising: a camera comprising a fluid inflow path, wherein a proximal end of the camera is configured to fluidly connect a fluid reservoir to the fluid inflow path; a cannula comprising a lumen, wherein the lumen is configured to be fluidly connected to the fluid inflow path at a distal end of the camera and a diameter of the cannula tapers, such as decreases, from a proximal end of the cannula towards a distal end of the cannula; and a scope, wherein the scope is configured to be connected to the distal end of the camera and a portion of the scope is configured to be inserted into the lumen of the cannula.

According to an aspect, a visualization system for medical procedures comprising: a camera comprising a fluid inflow path, wherein a proximal end of the camera is configured to fluidly connect a fluid reservoir to the fluid inflow path; a cannula comprising a lumen and an integrated rotation guide, wherein the lumen is configured to be fluidly connected to the fluid inflow path at a distal end of the camera;

and a scope, wherein the scope is configured to be connected to the distal end of the camera and a portion of the scope is configured to be inserted into the lumen of the cannula, and wherein the rotation guide is located on a proximal end of the cannula and configured to be positioned immediately distally of the distal end of the camera when the scope and cannula are connected to the camera.

Optionally, the scope comprises a light source.

Optionally, the camera comprises a light source.

Optionally, the scope is configured to be optically connected to the camera.

Optionally, the cannula comprises a fluid outlet at a distal end of the cannula fluidly connected to the lumen.

Optionally, the camera comprises a fluid outflow path and the proximal end of the camera is configured to fluidly connect the fluid outflow path to a fluid waste.

Optionally, the cannula comprises a second lumen. The second lumen can be configured to be fluidly connected to the fluid outflow path at the distal end of the camera.

Optionally, the cannula comprises a non-permeable barrier separating the lumen from the second lumen.

Optionally, the lumen and the second lumen are parallel.

Optionally, the lumen and the second lumen are multi-lumens, not co-axial.

Optionally, the cannula comprises a fluid inlet between a proximal end and a distal end of the cannula fluidly connected to the second lumen.

Optionally, a cross sectional area of the second lumen and the lumen decreases from the proximal end of the cannula towards the distal end of the cannula.

Optionally, the visualization system can include a fluid manifold configured to be connected to the camera and the cannula, wherein the fluid manifold fluidly couples the fluid inflow path of the camera to the lumen and the fluid outflow path to the second lumen.

Optionally, the cannula is configured to be rotatably connected to the fluid manifold.

Optionally, the camera, scope, and cannula are configured to be removably connected to one another Optionally, the scope and cannula are configured to be rotatably connected to the distal end of the camera.

Optionally, the scope and cannula are configured to rotate independent of the camera.

Optionally, the cannula comprises a cannula rotation guide on a proximal end of the cannula configured to rotate the cannula relative to the camera.

Optionally, the cannula rotation guide is configured to rotate the cannula and the scope when the portion of the scope is inserted into the lumen of the cannula.

Optionally, the cannula rotation guide is configured to be positioned immediately distal the camera when the scope and cannula are connected to the camera.

Optionally, a diameter of the cannula tapers, such as narrows, from a proximal end of the cannula towards a distal end of the cannula.

Optionally, a distal end of the cannula comprises a rounded tip.

Optionally, a portion of the rounded tip is configured to wrap around a portion of the distal end of the scope when the portion of the scope is inserted into the lumen of the cannula.

Optionally, the portion of the rounded tip is configured to wrap around a portion of the distal end of the scope without compromising or blocking illumination.

Optionally, the proximal end of the camera is configured to be communicatively coupled to a data cable and/or wirelessly, communicatively coupled to a computer.

Optionally, the proximal end of the camera is configured to be electrically coupled to a power cable and/or wirelessly, electrically coupled to a power source.

Optionally, the scope and camera are configured to be wirelessly, electrically coupled to one another.

Optionally, the scope and camera are configured to be wirelessly, electrically coupled to one another via inductive coupling.

It will be appreciated that any of the variations, aspects, features and options described in view of the systems apply equally to the methods and vice versa. It will also be clear that any one or more of the above variations, aspects, features and options can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

The invention will now be described, by way of example only, with reference to the accompanying drawings, in which:

FIG. 8 illustrates an example of a visualization system with the scope handle hidden and the fluid manifold made transparent in accordance with some embodiments disclosed herein.

FIG. 16A illustrates an example of a cannula of a visualization system in accordance with some embodiments disclosed herein.

FIG. 16B illustrates an example of a cross section of a cannula in accordance with some embodiments disclosed herein.

FIG. 22A illustrates an example of a light source connected to a scope in accordance with some embodiments disclosed herein.

In the Figures, like reference numbers correspond to like components unless otherwise stated.

DETAILED DESCRIPTION

Figure 1A:
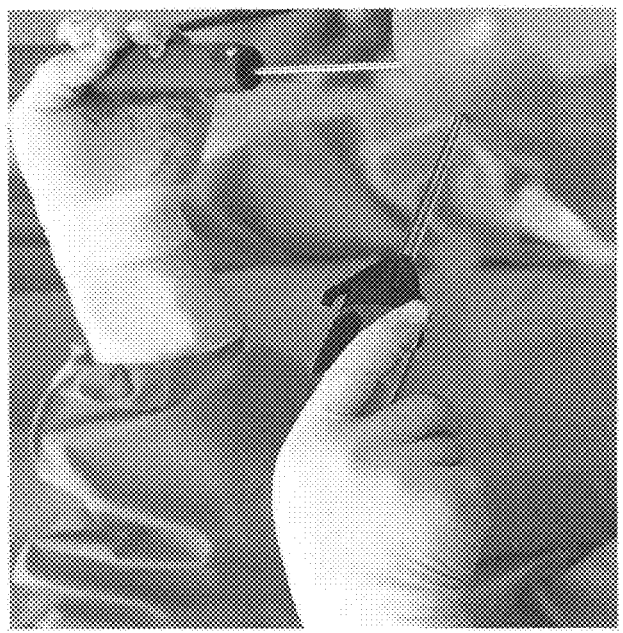
FIG. 1A is an image of a visualization system in accordance with some embodiments disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are ergonomic visualization systems and methods. According to some embodiments, the visualization systems described herein can achieve: (1) single-handed operation; (2) illumination integrated into the camera assembly; (3) wireless power in the scope; (4) better fluid management; and/or (5) a better cannula.

In existing endoscopic camera systems, the connection between the scope and camera is stiff, meaning that it can take significant effort from the user to rotate the scope to steer their DOV. This can make it even more difficult for a user to steer the DOV one-handed. The reason for the stiff connection is that the torque required to rotate the scope relative to the camera must be greater than the torque required to spin the stopcocks relative to the rest of the cannula to prevent the hanging fluid tubes from inadvertently changing the user's DOV. With respect to achieving single-handed operation, the ergonomic visualization system can declutter surgeon controls and working zones, it can allow for the ability to rotate DOV with a single hand, it can shorten the overall visualization system to improve control of the tip, and/or it can lessen the weight hanging off the visualization system.

With respect to achieving illumination integrated into the camera assembly, the visualization system can reduce the amount of parts needed for operation, it can reduce cost of goods sold (COGS), it can potentially lessen coupling losses by eliminating light guide junction, and/or it can eliminate fragile light guide resulting in a more durable product. With respect to achieving wireless power in the scope, the visualization system can enable illumination integrated into the camera assembly wherein the illumination source is in the scope and/or the system can allow flexibility for the introduction of other features requiring electricity/power in the scope (e.g., scope tip heating, ultrasonic tip cleaning, pressure sensing, usage, and/or other data stored in scope). With respect to improving fluid management, the visualization system can reduce clutter and improve ergonomics, it can allow inflow and/or outflow without adding tubing to the working zone, and/or it can contribute to shortening the overall length of the visualization system. With respect to improving the cannula, the visualization system can reduce the diameter of inflow and/or outflow lumens while minimizing change to pressure head loss through the cannula and/or it can reduce chances of causing tissue damage by incorporating a rounded tip.

FIGS. 1-20 illustrate examples of various aspects of a visualization system in accordance with some embodiments disclosed herein. The visualization system can be used for arthroscopic procedures. 80% of Sportsmed cases will be covered by the creation of 3 variants of integrated arthroscope 305: 4 mm 30' 140 mm; 4 mm 70' 140 mm; and 4 mm 70' 165 mm (more scopes can be developed and added later). In some embodiments, the visualization system can be used in Ear, Nose, and Throat ("ENT"), urology, gynecology, or other various medical applications.

The visualization system can include a camera 1 (e.g., autoclavable camera head 302 for single-chip imaging), a scope 2, and/or a cannula 3 (e.g., disposable or reprocessable cannula 304 offered in both continuous inflow/outflow or single-flow configurations). The camera, scope, and cannula can be configured to be removably connected to one another such that the camera, scope, and cannula can all be connected and disconnected from one another as described herein. The cannula can include at least one lumen and a portion of the scope can be configured to be inserted into the at least one lumen. The scope and/or cannula can be configured to be connected to the distal end of the camera. In addition, the scope and/or cannula can be configured to be rotatably connected to the distal end of the camera. As such, the scope and/or cannula can rotate independent of the camera. In some embodiments, the scope can be configured to be optically connected to the camera.

The camera can include a fluid inflow path 4. The fluid inflow path can be a lumen inside the camera. The proximal end 1a of the camera can be configured to fluidly connect a fluid reservoir 6 (and corresponding tubing (e.g., dedicated fluid management tubing 300)) to the fluid inflow path through fluid inlet 7c. The proximal end of the camera can be configured to be communicatively coupled to a data cable (e.g., lightweight data cable 301) or wirelessly, communicatively coupled to a computer. As such, the fluid reservoir (and corresponding tubing) can be fluidly connected to the proximal end of the camera alongside the data and/or power cable of the camera. The fluid reservoir can contain water, saline, or various other fluids used for medical procedures. The proximal end of the camera can be configured to be electrically coupled to a power cable or wirelessly, electrically coupled to a power source.

The camera can include a fluid outflow path 5. The fluid outflow path can be a lumen inside the camera. The proximal end of the camera can be configured to fluidly connect a fluid waste (and corresponding tubing) to the fluid outflow path through fluid outlet 7d. As such, the fluid waste (and corresponding tubing) can be fluidly connected to the proximal end of the camera alongside the data and/or power cable of the camera. In standard visualization systems, such as that shown in FIG. 1B and fluid cannula connection 25 in FIG. 2, the mechanisms for connecting fluid inflow and/or outflow to the cannula can add length to the cannula and contribute to making the entire visualization system longer. In addition, these fluid inflow and/or outflow connections towards or after the distal end of the camera can get in the way of a clinician when in use such that two hands are required to operate the visualization system. Standard scope adapter module 303 enables the entire existing endoscope portfolio to be used with the ASC camera: for users that want existing experience; allows the user of other smaller volume specialist scopes; and allows additional functionality such as fluorescence.

Figure 1B:
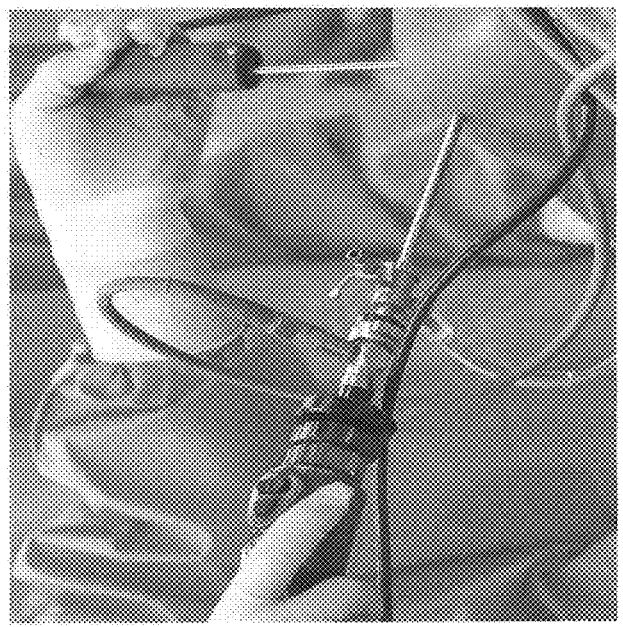
FIG. 1B is an image of an existing typical visualization system in accordance with some embodiments disclosed herein.
Figure 2:
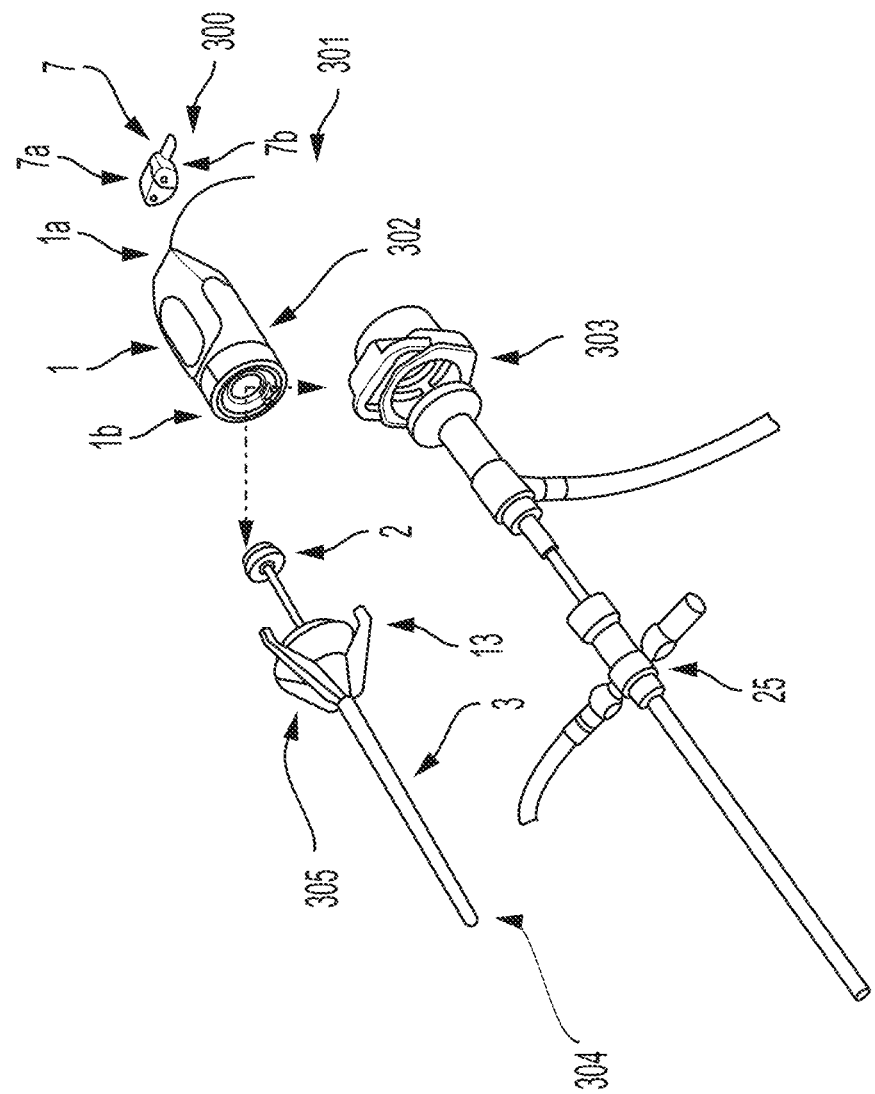
FIG. 2 illustrates example images of visualization systems in accordance with some embodiments disclosed herein.

In contrast, the visualization systems disclosed herein can be shorter and are de-cluttered (FIG. 1A) when compared to the standard visualization systems (FIG. 1B). Furthermore, fluid cannula connection 25 of FIG. 2 shows fluid inflow and outflow stopcocks that are located at the proximal end of the cannula, which would be in front of the surgeon's hand when they would be holding the camera. Having fluid tubes and stopcocks connect to the cannula towards the distal end of the camera can be problematic because the hanging tubes/cables can cause unwanted rotation of the scope. In addition, these fluid tubes/cables add to the bulk of the working zone of the clinician. Furthermore, the fluid tubes/cables towards the front of the visualization system can cause the weight of the visualization system to be unbalanced creating more of a challenge for the clinician to operate the visualization system.

A typical inflow-only (unidirectional) endoscopic camera system can include a pump, surgical tubing, a cannula, and a scope. Fluid can flow from the pump through the tubing, which is normally connected to a stopcock on a cannula. The typical cannula can be a hollow cylindrical part that fits over the scope's shank like a scabbard with its stopcocks on its proximal end. The fit between the cannula and the scope can leave a small gap between the scope's outer diameter and the cannula's inner diameter where fluid entering form the stopcock is allowed to flow to the scope's tip. A typical inflow-outflow (bidirectional) endoscopic camera system can be similar to the unidirectional system described above, except that the cannula includes two coaxial tubes, one fitting inside the other such that two-separate fluid paths lead from the distal end to two stopcocks at the proximal end of the cannula.

In contrast, the visualization systems disclosed herein can eliminate fluid management tubes from the working zone (i.e., in front of the distal end of the camera). The fluid inflow path and fluid outflow path can be two separate lumens passing through the camera towards the distal end of the camera to fluidly connect with the cannula. As such, any fluid entering the camera can enter at the proximal end of the camera and any fluid leaving the camera can leave the proximal end of the camera. By connecting the fluid tubing 7 (e.g., inflow tubing 7a and/or outflow tubing 7b) to the proximal end of the camera at fluid inlet 7c, hanging cables/tubes can be eliminated from and can no longer cause inadvertent rotations of the scope while the clinician uses the visualization system. In addition, fluid inflow and/or outflow can be controlled at the camera head rather than in front of the distal end of the camera. The control of fluid in and/or out of the system can e.g. be controlled by members 7f (e.g., stopcocks)

As stated above, the visualization system can include a cannula having at least one lumen. A portion of the scope can be configured to be inserted into the at least one lumen of the cannula. The at least one lumen of the cannula can be configured to be fluidly connected to the fluid inflow path of the camera at the distal end of the camera. In this example, the cannula can comprise a fluid outlet 8d at a distal end 3b of the cannula. The fluid outlet can be fluidly connected to the at least one lumen (e.g., inflow lumen 8a). The fluid outlet of the cannula can be configured to release fluid at the distal end of the scope such that it can be used to clean the distal end of the scope.

Figure 16C:
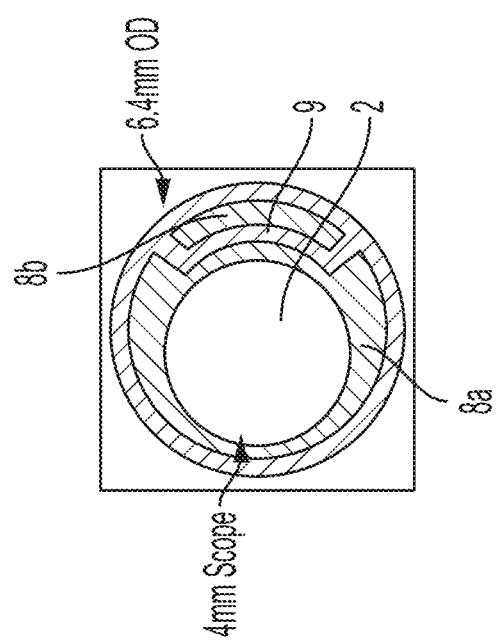
FIG. 16C illustrates another example of a cross section of a cannula in accordance with some embodiments disclosed herein.

Optionally, the cannula can include a second lumen and the second lumen can be configured to be fluidly connected to the outflow path of the camera at the distal end of the camera. For example, FIG. 16A illustrates a cannula 3 with an inflow lumen 8a and an outflow lumen 8b. The cannula can include a fluid inlet 8c between a proximal end 3a and a distal end 3b. The fluid inlet of the cannula can be fluidly connected to the outflow lumen. The cannula can include more than one fluid inlet fluidly connected to the outflow lumen. The fluid inlet can be used to remove waste fluid during use of the visualization system. A portion of the scope can be configured to be inserted into the outflow lumen or the inflow lumen as shown in FIG. 16B and FIG. 16C. A non-permeable barrier 9 can separate the first lumen from the second lumen.

Existing inflow-outflow (bidirectional) cannulas are significantly thicker in diameter than their inflow-only (unidirectional) counterparts. Existing inflow-outflow cannulas use a co-axial lumen layout that makes inefficient use of available spaces.

In some embodiments, the first lumen and the second lumen in the cannula can be parallel flowing lumens. For example, the multi-lumens can be aligned side-by-side instead of coaxially as shown in FIG. 16A. The cannula can e.g. include two parallel lumens to transport fluid instead of conventional coaxial lumens. This can improve flow characteristics of the cannula and allow lumens to have smaller cross-sections, thereby shrinking the overall diameter of the cannula. In addition, parallel fluid paths can result in a higher cross-sectional area to perimeter ratio than a coaxial layout. This ratio can be predictive of pressure head loss over the length of the cannula. As such, increasing the ratio can mean that the overall diameter of the cannula can be reduced while minimizing impact on pressure head loss.

In some embodiments, the diameter of the cannula can taper, such as decrease, from a proximal end $3a$ of the cannula to a distal end $3b$. The tapered cannula can provide better flow characteristics, a stiffer body (i.e., more resistant to bending moments), and a smaller possible tip diameter. For example, the diameter at the proximal end of the cannula can be 6.5 mm and the diameter at the distal end of the cannula can be 5 mm as shown in FIG. 16A. Having a narrower distal tip can preserve flow characteristics of fluid in the lumen(s) as the diameter of the cannula at the distal tip can be made smaller without greatly impacting pressure head loss across the cannula. For example, the fluid passages at the proximal end of the cannula can be opened to partially compensate for their contraction at the distal end.

In addition, the distal tip of the cannula should be able to fit into narrow cavities while the diameter of the base or proximal end has much looser restrictions. Furthermore, the cross sectional area of the first lumen and the second lumen can decrease from the proximal end of the cannula towards the distal end of the cannula. The cross section area of the first lumen can for instance be equivalent to the cross sectional area of the second lumen as shown in FIG. 16B. In some embodiments, the design of the first and the second lumen can be that shown in FIG. 16C. As shown in FIG. 16C, the outflow lumen $8b$ can have a cross sectional shape of an arc and the inflow lumen $8a$ can have a cross sectional shape of a circle with an arc portion removed from its perimeter resembling that of Pacman with a round pellet in its mouth. The cannulas described herein can be formed, 3D printed, injection molded, laser cutting, electroformed, and/or cast among other options.

In addition, existing cannulas (e.g., metal cannulas) may have sharp tips where the thin tube that forms the shank of the cannula ends. Even if these tips are sanded down, they can remain sharp because the metal they normally consist of is so thin. These sharp tips can cause damage to the patient's anatomy (e.g., smooth cartilage bearing surface of joints) when the camera is inserted during a procedure.

Figure 18:
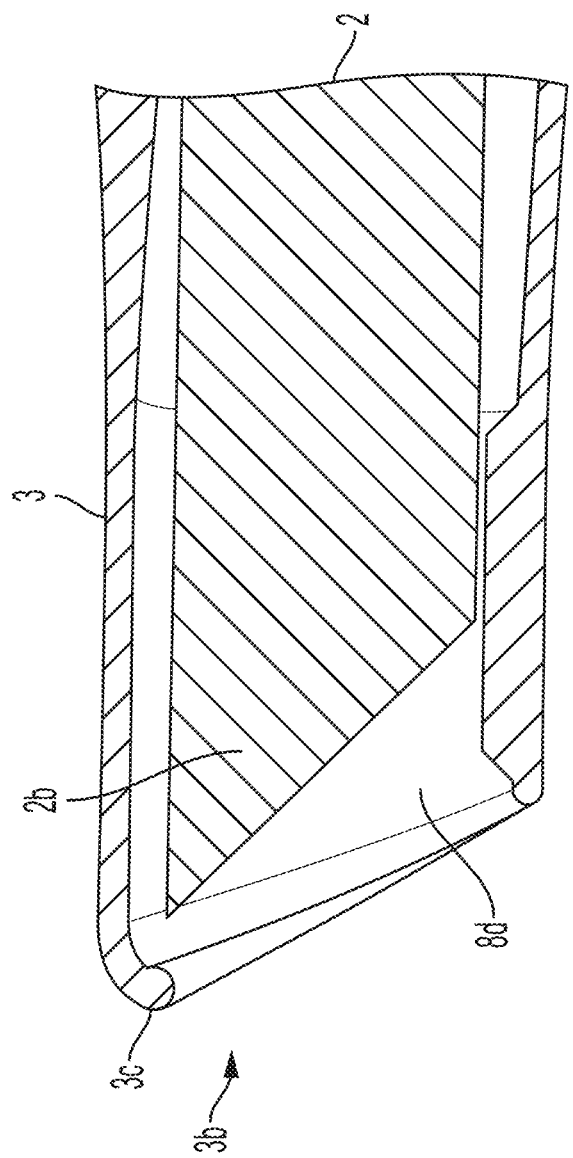
FIG. 18 illustrates a cross section of the distal end of a cannula and scope of a visualization system in accordance with some embodiments disclosed herein.
Figure 19B:
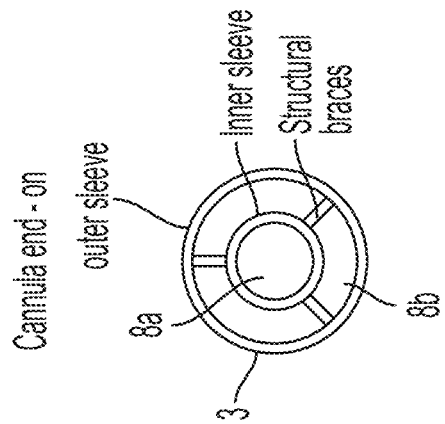
FIG. 19B illustrates an example of a cross section of a cannula of a visualization system in accordance with some embodiments disclosed herein.
Figure 19A:
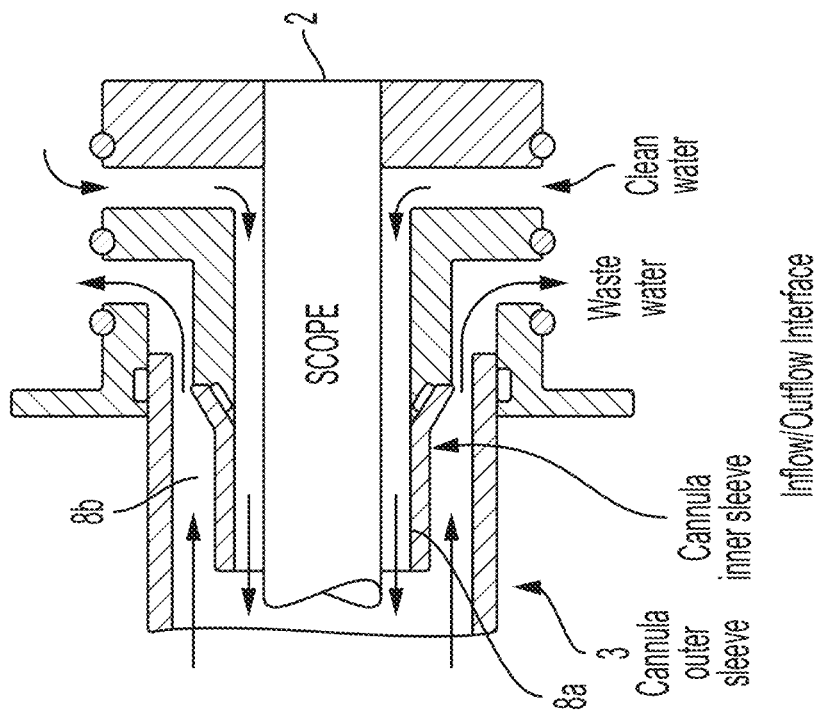
FIG. 19A illustrates a cross section of a fluid inflow and outflow of a cannula of a visualization system in accordance with some embodiments disclosed herein.

In some embodiments, the distal end of the cannula can include a rounded tip such as rounded tip $3c$ shown in FIG. 18. Existing cannula systems often scratch or otherwise damage patient anatomy (e.g., hyaline cartilage) during procedures. In order to avoid this, some existing cannula systems place an overmolded plastic tip over the tip of the cannula. However, this results in a bulkier, more thick-walled cannula and can reduce maneuverability in the target anatomy space. The cannulas described herein can reduce or eliminate all sharp edges (e.g., edge radii larger than at least 10 microns, 20 microns, 30 microns, 40 microns, or 50 microns) on the tip of the cannula. In addition, the cannulas described herein can wrap around at least a portion of the scope distal tip to reduce or prevent any of the scope's edges from coming into contact with patient anatomy. In some embodiments, a portion of the rounded tip can be configured to wrap around a portion of the distal end $2b$ of the scope when a portion of the scope is inserted into a lumen of the cannula. The portion of the rounded tip can be configured to wrap around a portion of the distal end of the scope without compromising or blocking any illumination from the scope and/or camera. The rounded tip can partly wrap over the edges of the scope, thereby eliminating sharp spots that can cause damage to patient anatomy and reduce/prevent any sharp edges from touching the scope. The rounded tip can be an integral part of the cannula. Alternatively, the rounded tip can be a separate component that can be configured to be attached or connected to the distal end of the cannula.

In some embodiments, the visualization system can include a fluid manifold 10. In some embodiments, the cannula can comprise the fluid manifold. In some embodiments, the scope can comprise the fluid manifold. In some embodiments, the camera can comprise the fluid manifold. In some embodiments, the fluid manifold can be its own component.

In some embodiments, the fluid manifold can be configured to be connected to the camera and the cannula (and scope), wherein the fluid manifold can fluidly couple the fluid inflow path of the camera to the inflow lumen of the cannula and the fluid outflow path of the camera to the outflow lumen of the cannula. In some embodiments, the fluid manifold can be connected to the camera via a coupling ring.

Figure 7A:
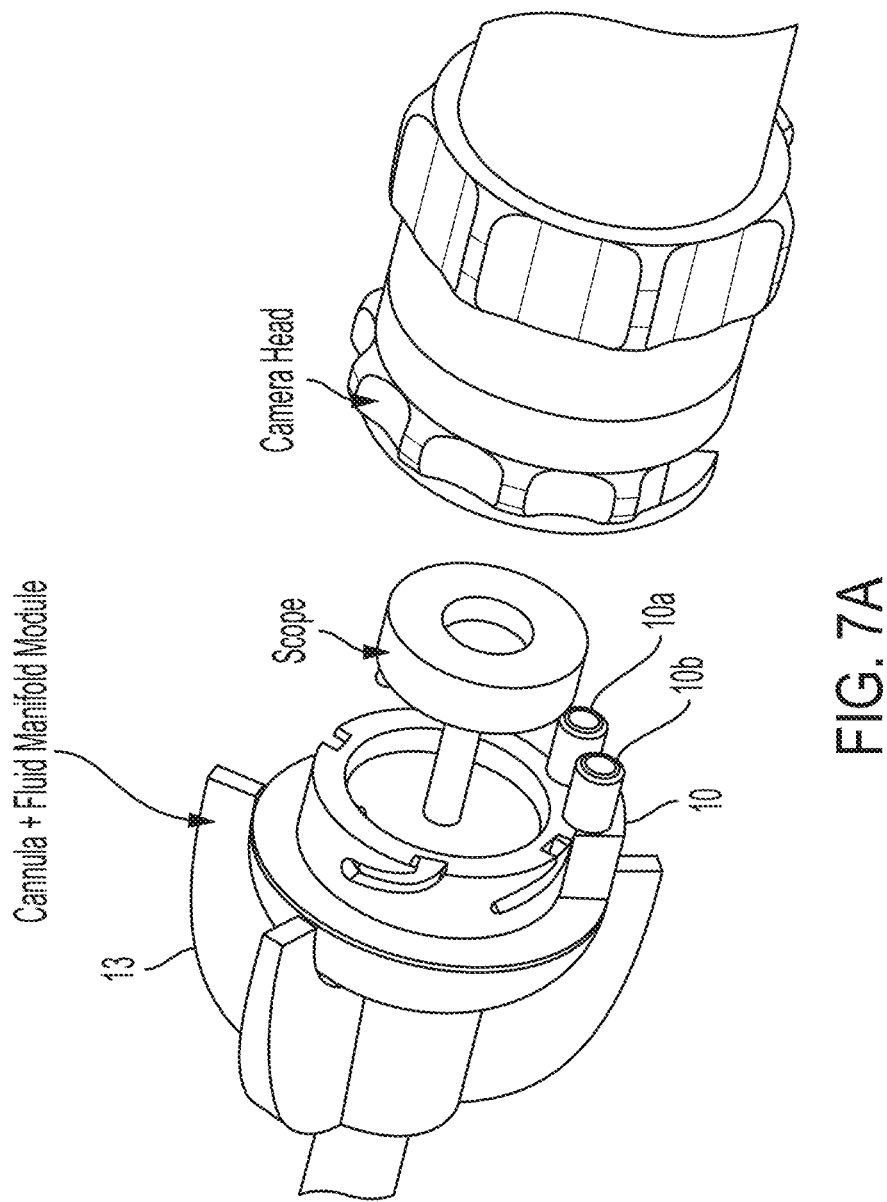
FIG. 7A illustrates an example of an exploded rear view of a visualization system in accordance with some embodiments disclosed herein.
Figure 7B:
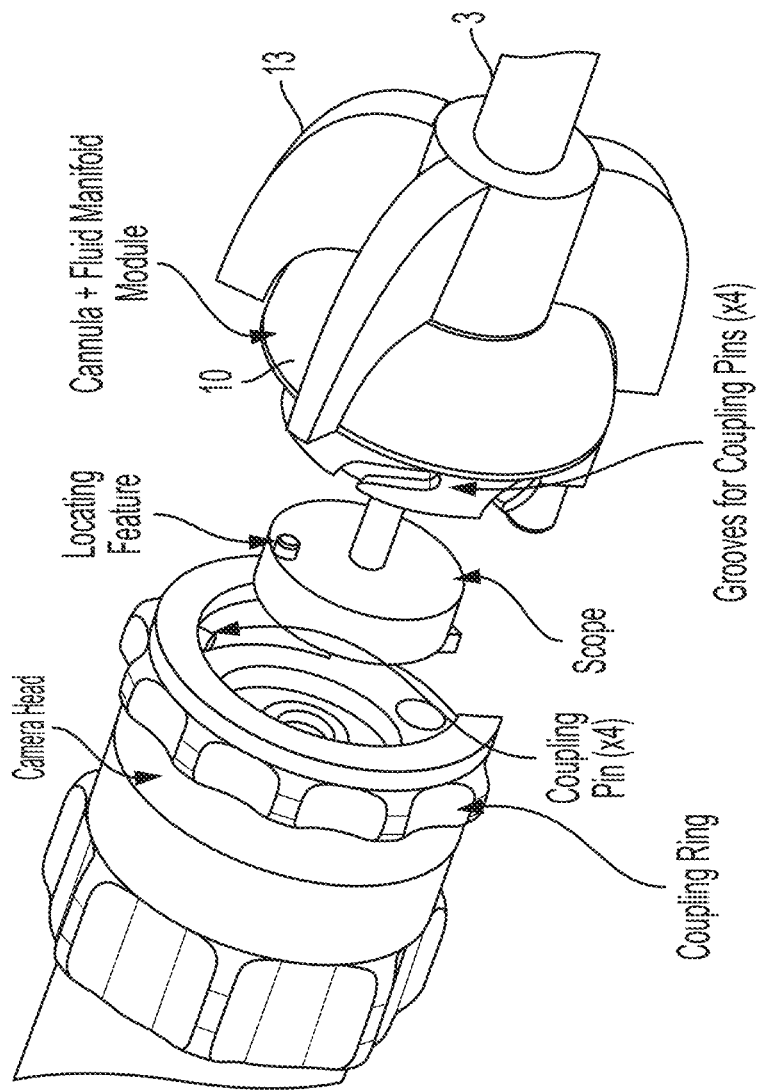
FIG. 7B illustrates an example of an exploded front view of a visualization system in accordance with some embodiments disclosed herein.

FIGS. 7A-7B illustrate exploded views demonstrating how a user can attach a scope and cannula to the camera. For example, a user can insert the scope into the cannula and fluid manifold module. Then, they can insert the scope and cannula into the camera. The scope and cannula can be secured in place by turning the coupling ring and driving the coupling pins (locating feature) up the grooves cut into the fluid manifold.

The cannula can be configured to be rotatably connected to the fluid manifold. The fluid manifold can allow for one or two independent flow paths between the camera and the cannula/scope while allowing the cannula/scope to rotate relative to the camera any number of times. The camera and the fluid manifold can be static while the scope and cannula are free to rotate. For example, the fluid manifold can act as a two-channel "fluid slip-ring" that is used to transport inflowing (inflow path $10a$) and outflowing fluid (outflow path $10b$) from the static camera head to the rotating cannula. Inflow path $10a$ of the manifold can be fluidly connected to the inflow path 4 of the camera and outflow path $10b$ of the manifold can be fluidly connected to outflow path 5 of the camera. In addition, inflow path $10a$ of the manifold can be fluidly connected to the inflow lumen of the cannula and outflow path $10b$ of the manifold can be fluidly connected to the outflow lumen of the cannula. In some embodiments, the two fluid flow paths of the manifold can remain separated at all times regardless of how the cannula is rotated relative to the camera. In some embodiments, the fluid manifold can allow for the cannula/scope to be disconnected from the camera. In some embodiments, the fluid manifold can be compatible with both unidirectional and bidirectional cannulas.

Figure 15:
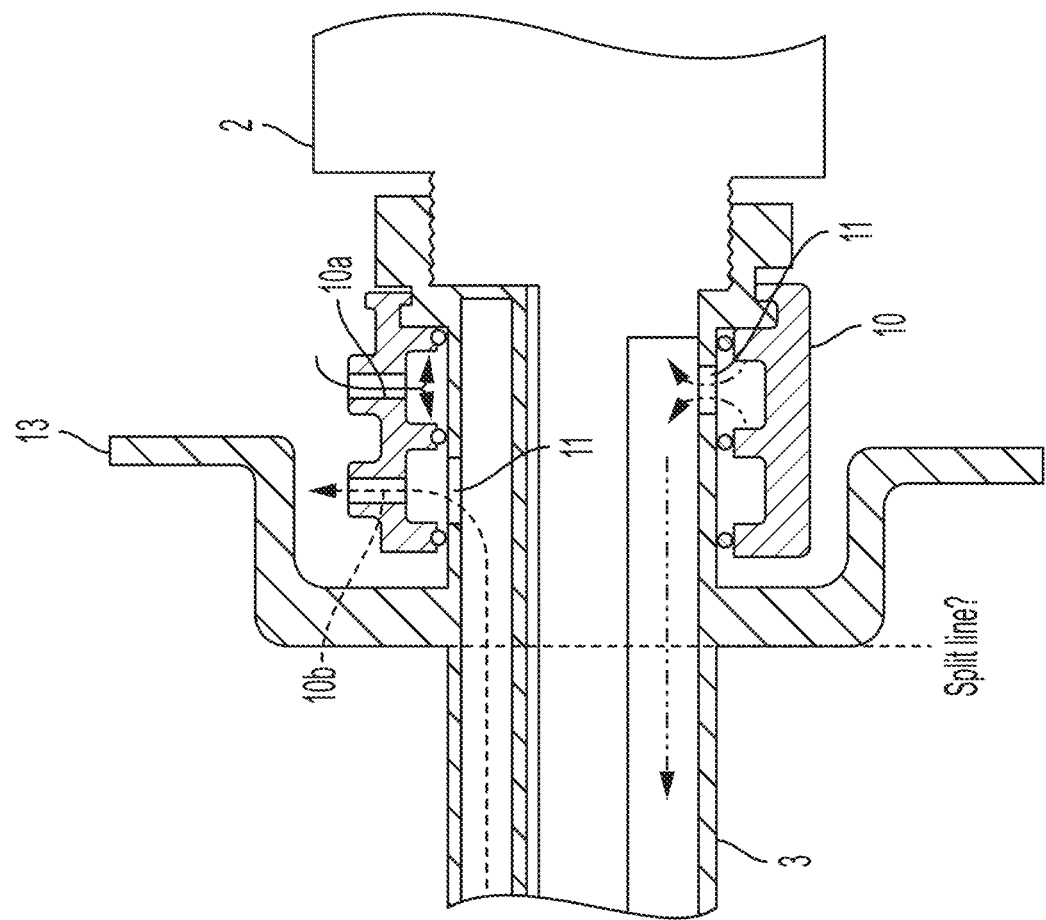
FIG. 15 illustrates an example of a cross section of a fluid manifold, cannula, and scope of a visualization system in accordance with some embodiments disclosed herein.
Figure 17B:
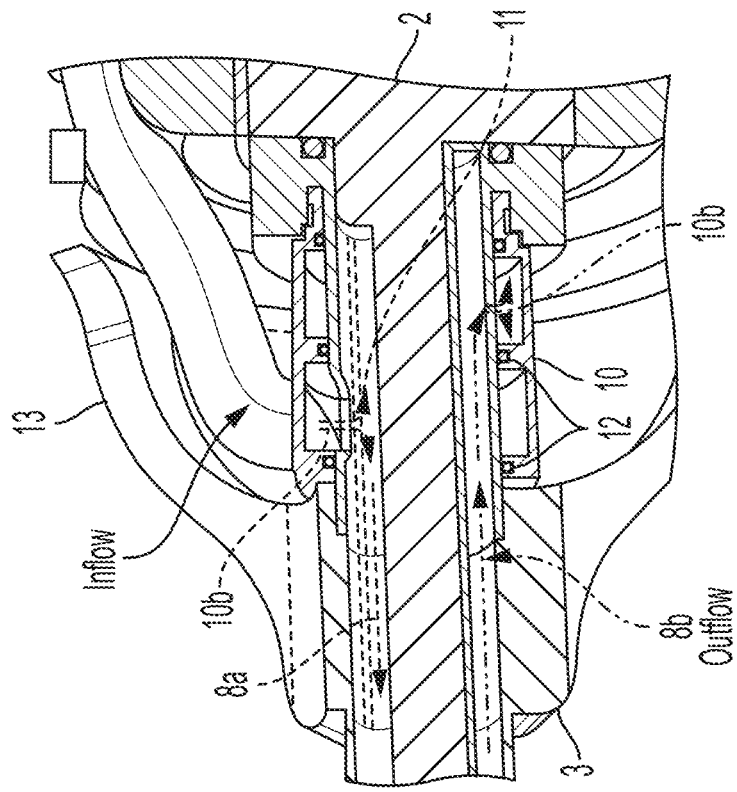
FIG. 17B illustrates an example of a cross section of the visualization system of FIG. 17A in accordance with some embodiments disclosed herein.
Figure 17A:
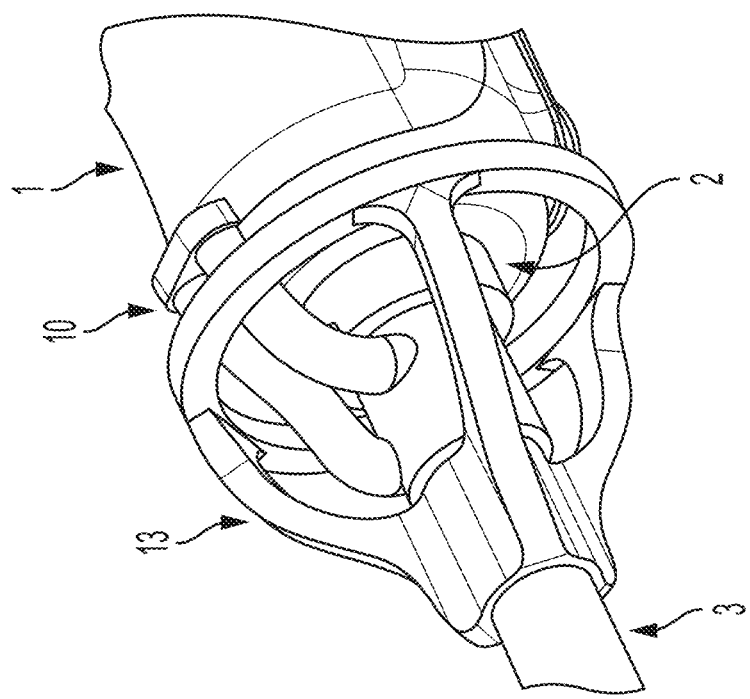
FIG. 17A illustrates an example of a fluid manifold, cannula, and scope of a visualization system in accordance with some embodiments disclosed herein.

In some embodiments, the fluid manifold can spin about its z-axis (from distal tip to proximal end). For example, $10b$ in FIG. 15 illustrates the path the outflowing fluid takes through the manifold, and the $10a$ illustrates the path of the inflowing fluid. Fluid from the manifold can enter/exit the cannula from apertures 11 into the inflow lumen and the outflow lumen as shown in FIG. 15. The operation of this concept can be similar to that of a hydraulic slip ring. FIGS. 17A and 17B illustrate another example of a fluid manifold 10. As shown in these figures, the fluid manifold 10 can be captive in the cannula 3, but allowed to rotate on its z axis. Black O-rings 12 are shown to indicate seals in this design.

In some embodiments, the cannula can include a cannula rotation guide 13 on a proximal end of the cannula configured to rotate the cannula relative to the camera. The cannula rotation guide can be an integral part of the cannula forming a single-piece cannula, rather than the cannula rotation guide being a separate part that is attached to the cannula. The cannula rotation guide can be configured to rotate the cannula and the scope when the portion of the scope is inserted into the lumen of the cannula. The cannula rotation guide can be configured to be positioned immediately distal the camera when the scope and cannula are connected to the camera. A portion (e.g., rotation tabs) of the cannula rotation guide can overlap a distal end of the camera when the scope and cannula are connected to the camera. In some embodiments, a portion (e.g., rotation tabs) of the cannula rotation guide may overlap a distal end of the fluid manifold when the scope, cannula, and fluid manifold are connected to the camera.

Figure 4:
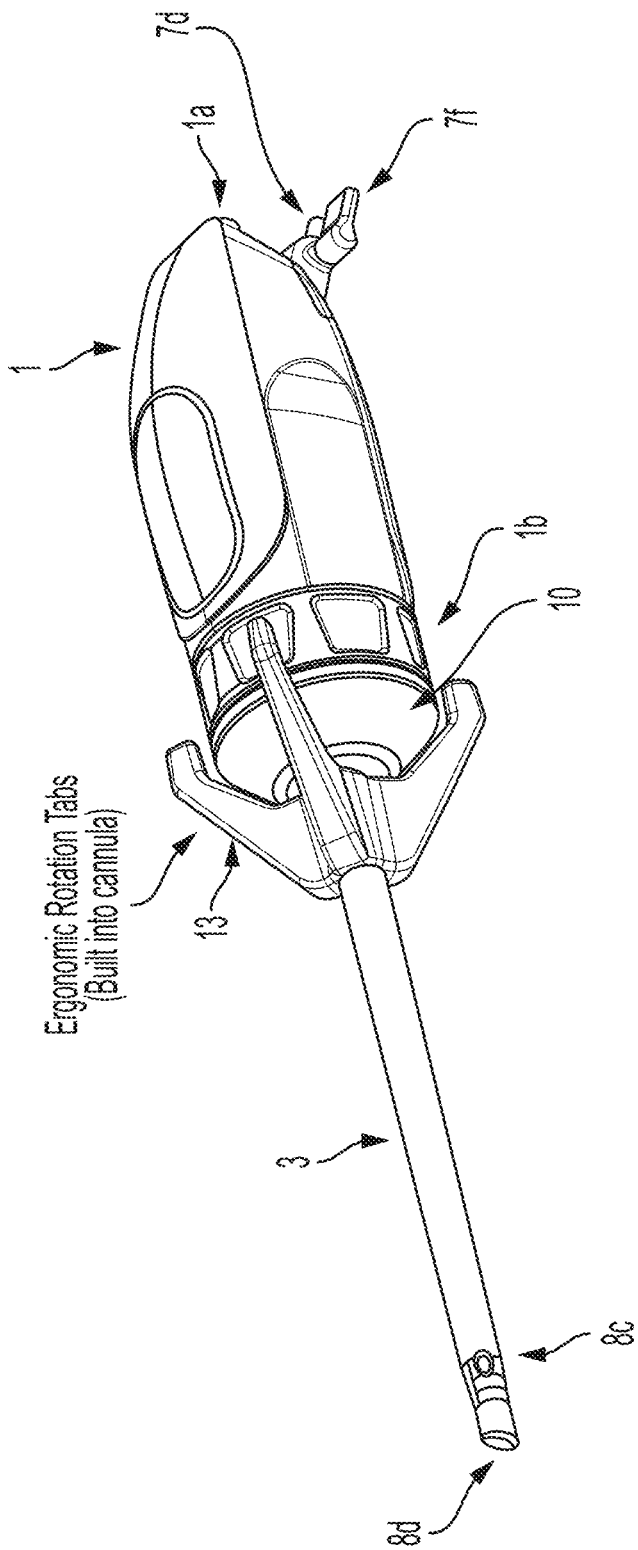
FIG. 4 illustrates an example of a rotation guide built into the cannula for a visualization system in accordance with some embodiments disclosed herein.
Figure 5:
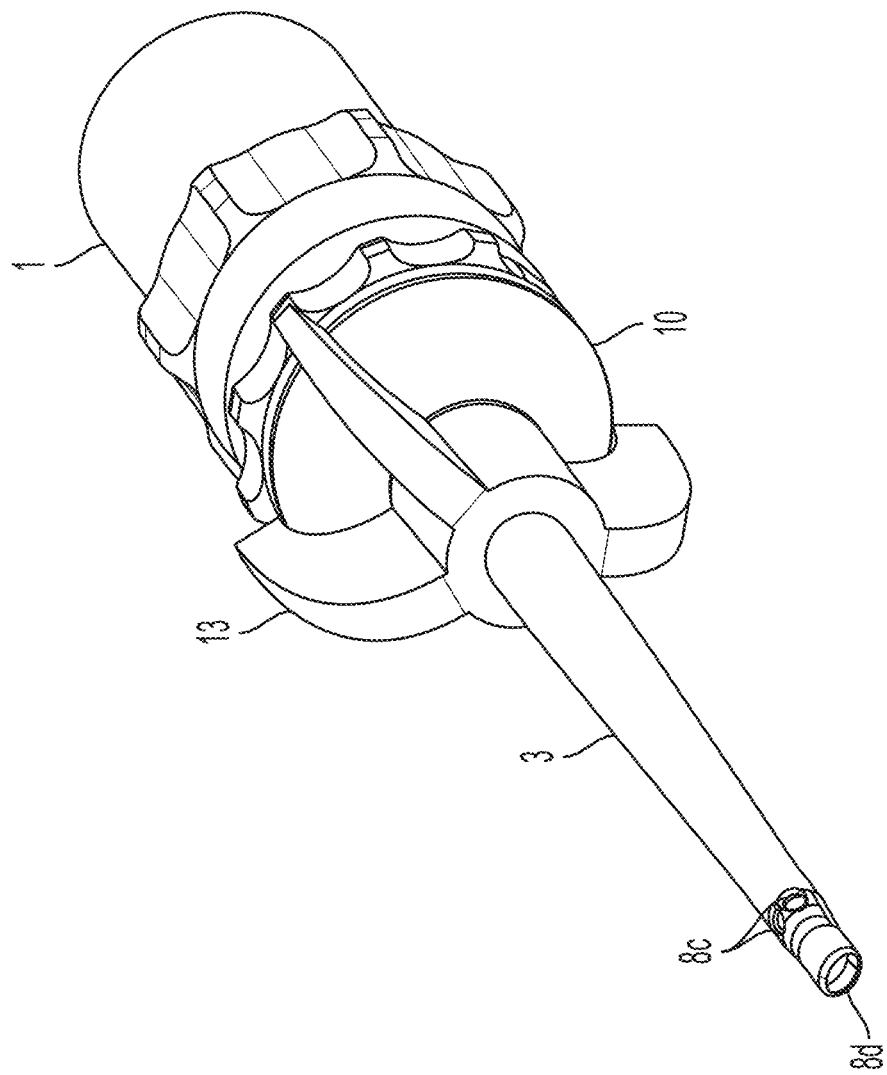
FIG. 5 illustrates an example of a visualization system in accordance with some embodiments disclosed herein.
Figure 6:
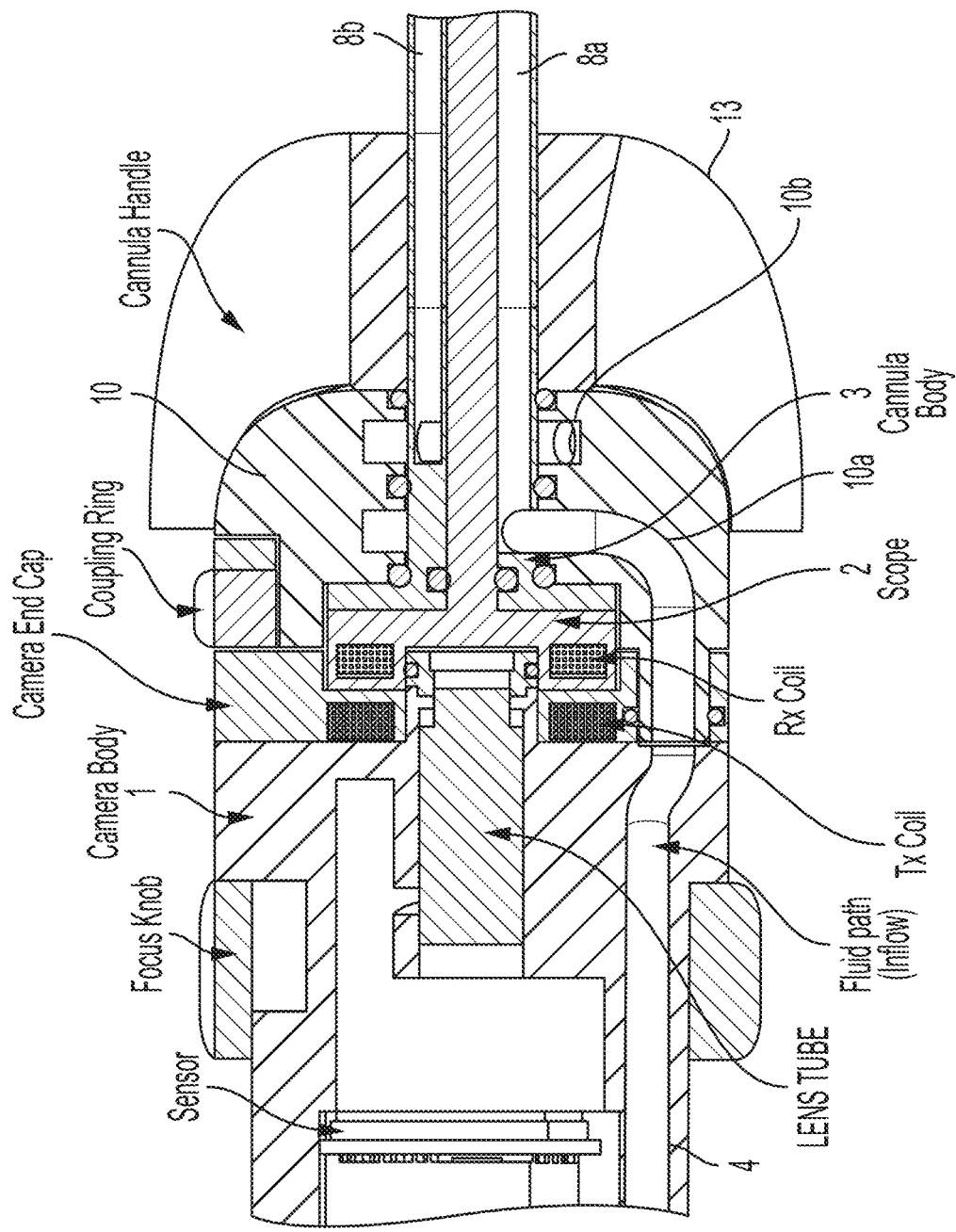
FIG. 6 illustrates an example of a cross section of a visualization system in accordance with some embodiments disclosed herein.

The cannula rotation guide can include at least one ergonomic rotation tab. For example, FIG. 4 illustrates a cannula with a cannula rotation guide built into the cannula (or scope) that includes three ergonomic rotation tabs. A user can hold or maneuver the cannula rotation guide in order to rotate the scope/cannula (with rotation guide) while the camera (and fluid manifold) remains static. As such, the user's manipulation of the cannula rotation guide can allow for single handed rotation of the DOV while holding the camera. This can free up the user's second hand to operate other tools.

Besides fluid management tubing, light engines can add to setup complexity and/or COGS. In contrast, scope/cannula or camera illumination can eliminate the need for a light engine. This can make the visualization system cheaper and simpler as a result.

The scope, cannula, or camera can comprise a light source for illumination. In other words, no separate light source may be required. This can remove the need for a fiber-optic light guide by incorporating a light source (i.e., illumination source) into the camera, cannula, or scope while maintaining the ability to rotate the scope any number of times relative to the camera. Light guides are expensive and easily damaged by being stepped on, rolled over with other medical carts, or by being bent too sharply. In addition, they wear out quickly. Furthermore, having the light guide attached to the scope is problematic because the hanging weight of the cable can cause unwanted rotation of the scope and adds to the bulk of the scope that the user is attempting to make fine adjustments to. This weight can also force the camera designers to add additional friction in the scope rotation in order to counteract the force of gravity. Without this constraint, rotating the scope could be made easier.

Figure 21:
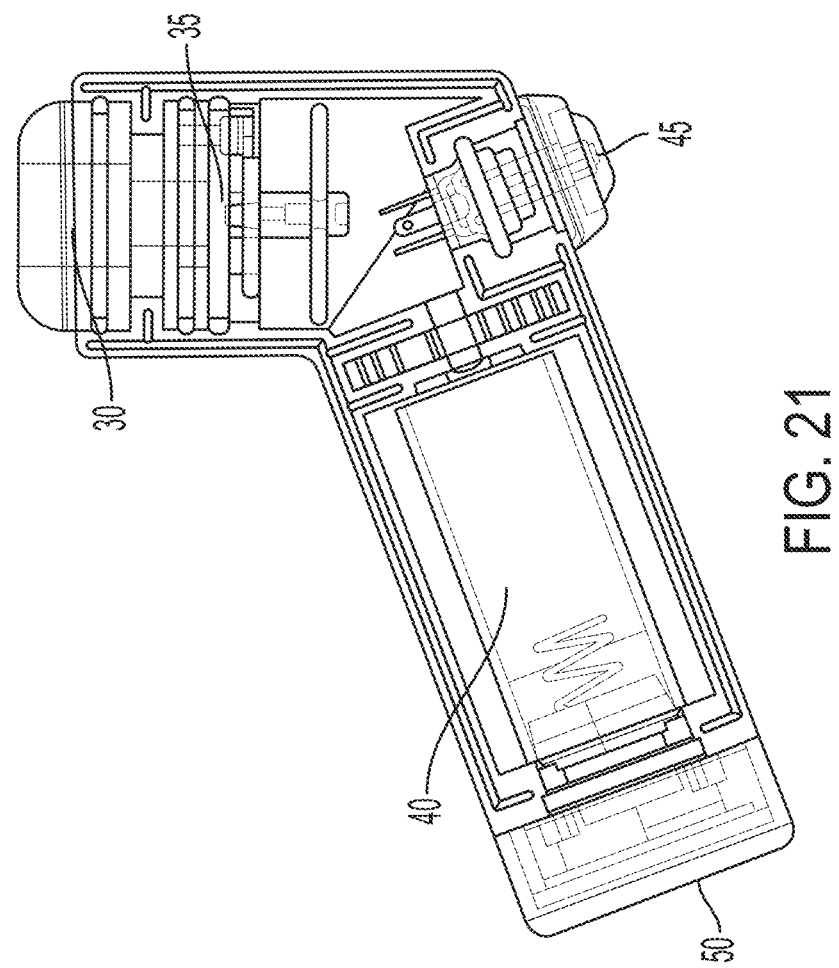
FIG. 21 illustrate an example of a light source configured to be connected to a scope in accordance with some embodiments disclosed herein.
Figure 22B:
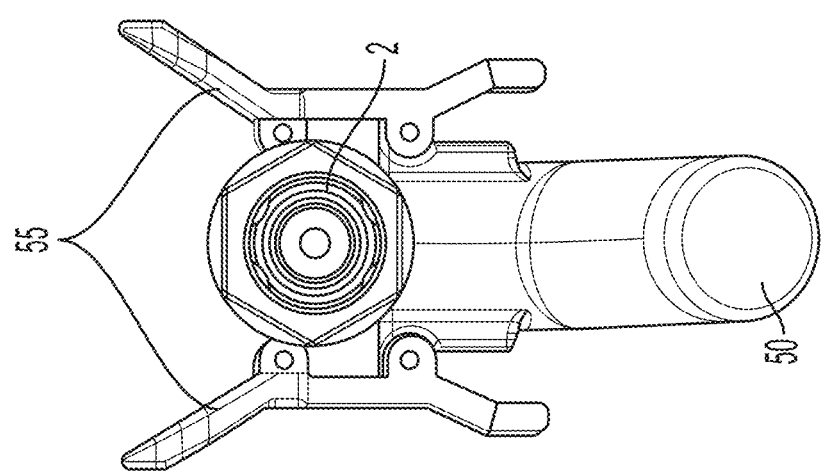
FIG. 22B illustrates an example of another view of a light source connected to a scope in accordance with some embodiments disclosed herein.
Figure 22C:
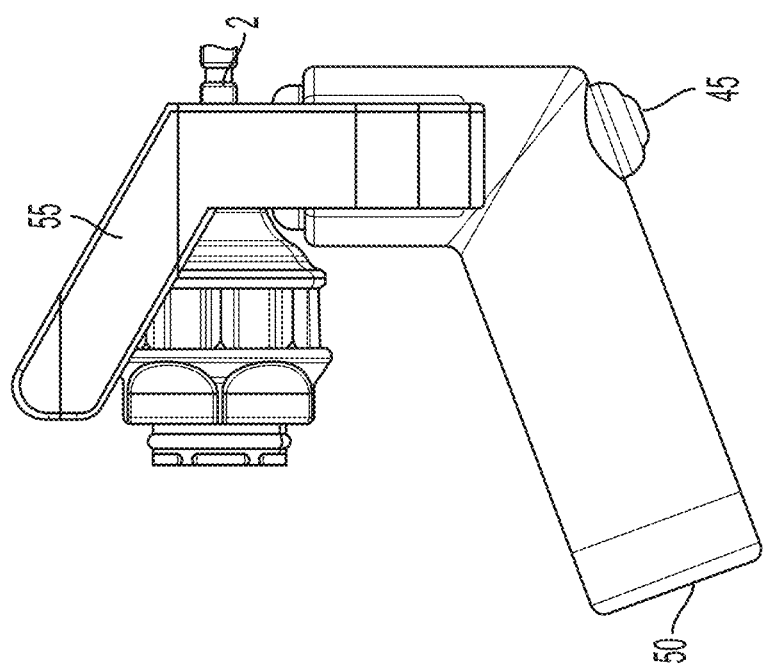
FIG. 22C illustrates an example of a third view of a light source connected to a scope in accordance with some embodiments disclosed herein.

The light source can for instance be connected to the scope to provide illumination during medical procedures without the cumbersome cables. For example, FIG. 21 illustrates an example of a light source configured to be connected to a scope. The light source can include an optical assembly 30 (e.g., LED), a battery 40, a power button 45, a removable battery access cap 50, and/or a power controller 35 in an autoclavable package that can clip or connect onto the scope in order to provide illumination during medical procedures. In addition, the light source with scope can include a plurality of paddles or wings 55 (as shown in FIGS. 22A-C), which can extend proximally (and slightly laterally), allowing the surgeon to rotate the assembly (and thus the scope itself), to adjust his or her field of view. As such, the plurality of paddles can be connected to the scope and the light source to allow for rotation of the scope and light source assembly by one hand of the user. The paddles can be spring loaded to grip the side of the scope body to hold the assembly in place, and free of rotation as well serve as ergonomic touch points. The battery can provide power to the controller and the controller can monitor the state of charge and deliver constant current to the LEDs ensuring constant illumination even as battery voltage fails. The controller can provide power to the LED. The LED can be mounted to a metal PCB, designed to transfer its heat into the scope 2. Heating the scope may be beneficial to reduce fogging. The light from the LED can pass through a lens, such as a half ball lens, focusing it, and reducing loss of light in the coupling to the scope. The battery can be insulated (e.g., wrapped in aerogel to insulate it from the high temperatures of the autoclave). The cap 50 on the proximal end can allow the battery to be removed from the device for replacement or charging. By including power and an LED in the surgical field, the cable and console can be eliminated when using scopes. This can free up clutter from the surgical space and reduce the number of consoles on the tower. To be sterilizable, most components of the light source can be selected to be able to handle high temperatures of an autoclave. The housing can be made of a high temperature resistant plastic material, such as a polyetherimide, e.g. Ultem. The light source can e.g. include high temperature electronics. To enable one handed rotation, the main body of the light source can be canted back towards the hand of the surgeon. In addition, two paddles can also be directed towards the surgeon's hands. One challenge was that the lightpost can be designed to allow light cables to rotate but in some cases the users do not want the clip to rotate about the light post. The clamping wing design can eliminate this rotation and can also eliminate the need to screw the device on. Instead, the light source can be squeezed and insert the light post in the light clip. The light source can also provide a low power notice. For example, the controller can be configured to monitor how much charge has passed through the light source. Alternatively, or additionally, the controller can be configured to monitor the voltage to a very high degree. The controller can use a 12 bit DAC to convert the analog battery voltage to a precise digital measure that can be interpreted by the controller. Given these two pieces of information, the state of charge can be accurately computed, and when the power gets low, a notification or alert can be provide to the user by flashing the output of the LED.

In the examples, the light source can be an LED, laser diode, or similar source. When the light source is in the camera, an optical connection between the camera and the scope/cannula can be used that will allow the scope to be removed or rotated relative to the camera.

Figure 3:
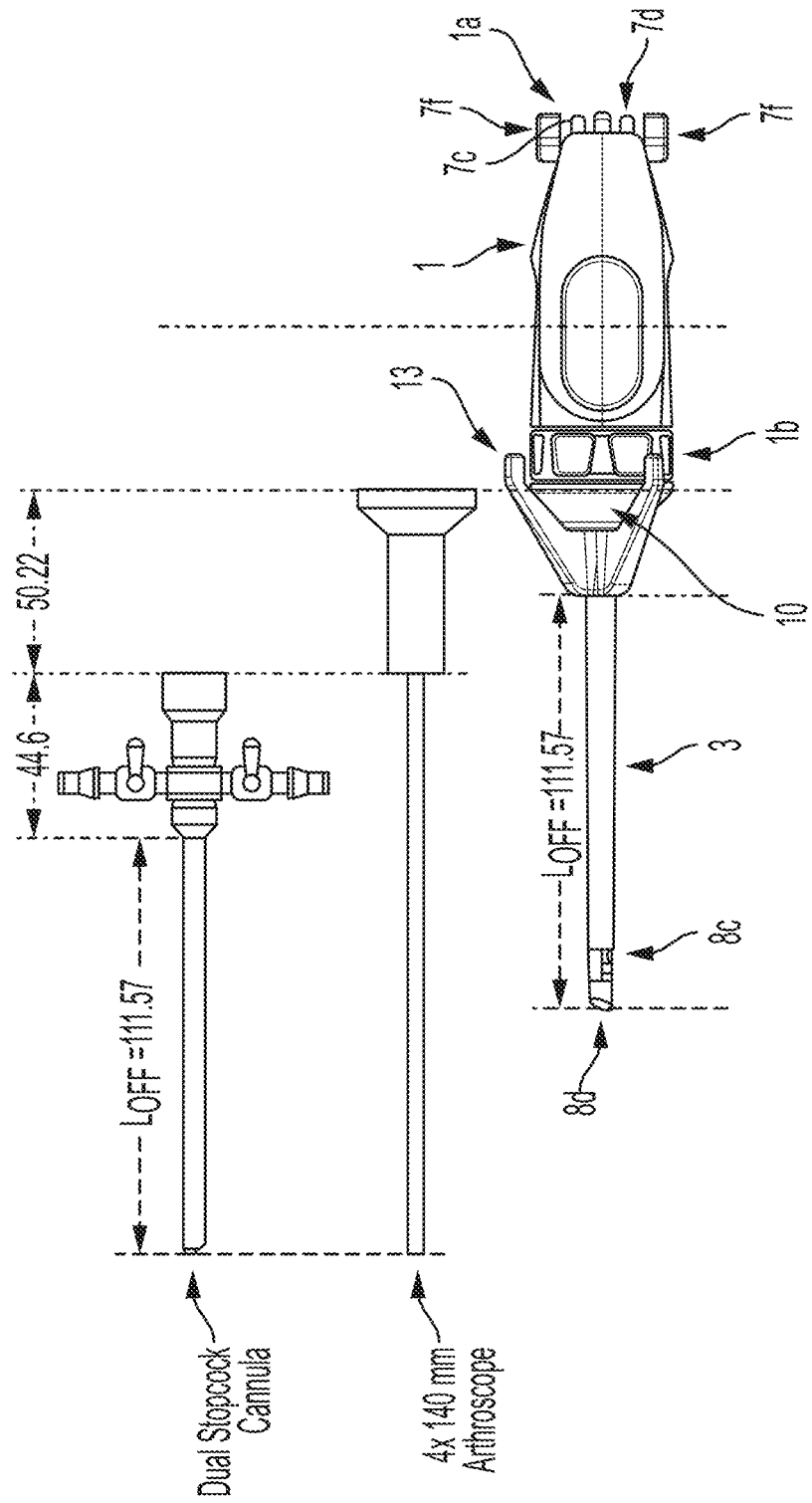
FIG. 3 illustrates examples of various lengths of visualization systems in accordance with some embodiments disclosed herein.

This systems disclosed herein can eliminate or reduce the need for scope light post, which can take up valuable space in the user's working zone. Eliminating the light post can allow the scope to be made shorter without sacrificing working length (i.e., the distance form distal end of scope to proximal end of cannula's shank). Incorporating illumination and fluid management into the scope/camera/cannula visualization system can allow the overall distance between the user's hand and the viewing target to be significantly shorter than those systems that exist today, thereby improving maneuverability and increasing control. In FIG. 3, the working length can be identified by the $L_{OFF}$ dimension. The working length of the visualization system disclosed herein can have the same as a standard arthroscope, but the overall length can be considerably shorter. The visualization system disclosed herein can eliminate an orthonormal protrusion from the scope optical axis that can impact the user's ability to hold and maneuver the visualization system equipment/components.

In some embodiments, the light source can be located near the proximal end of the scope and coupled to optical fibers that deliver its light along the length of the scope to the distal end/tip. Other embodiments can include a chip on tip. In some embodiments, light can be transported to the distal end of the visualization system via optical fibers in scope, optical fibers in cannula, the light source on the tip of the scope or cannula, and/or a transparent cannula acting as a light pipe. In some embodiments, the light source can be integrated into the scope as opposed to the camera or scope. This can avoid the coupling losses at the junction between the scope and the camera and can allow the cannula to be produced more cheaply.

In some embodiments, the light-guide can be eliminated by including an electrically driven source mounted in the camera, scope, or cannula powered by an already-existing electrical connection between the camera and a processing and/or power unit connected to the camera. When the light source is in the scope/cannula, wireless power can be transmitted to the scope from the camera to enable the scope to be removed or rotated without hindrance from a wired electrical connection.

In some embodiments, the scope and/or cannula can be configured to be wirelessly, electrically coupled to one another. In other words, there may be no electrical contact between the scope/cannula and camera. The scope and camera can e.g. be configured to be wirelessly, electrically coupled to one another via inductive coupling. By providing wireless power to the scope and/or cannula, scope-integrated electrically-driven light sources can be facilitated as well as the use of other power-consuming devices inside the scope and/or cannula. In addition, inductive or other wireless power transfer between the camera and the scope/cannula can power energy-consuming devices integrated into the scope/cannula while allowing the scope/cannula to be rotated any number of times without interruption of power supplied. Electrical power in the scope/cannula can also be used to power other energy-consuming devices (e.g., small heaters for eliminating scope fogging, electronics that identify and track the use of scopes, ultrasonic tip cleaning, pressure sensing, etc.). The visualization system disclosed herein can deliver power to the scope while the scope can be rotated any number of times relative to the camera without affecting power delivery, the scope can be disconnected and reconnected to the camera, and there is no electrical contact between the scope and camera.

Figure 9:
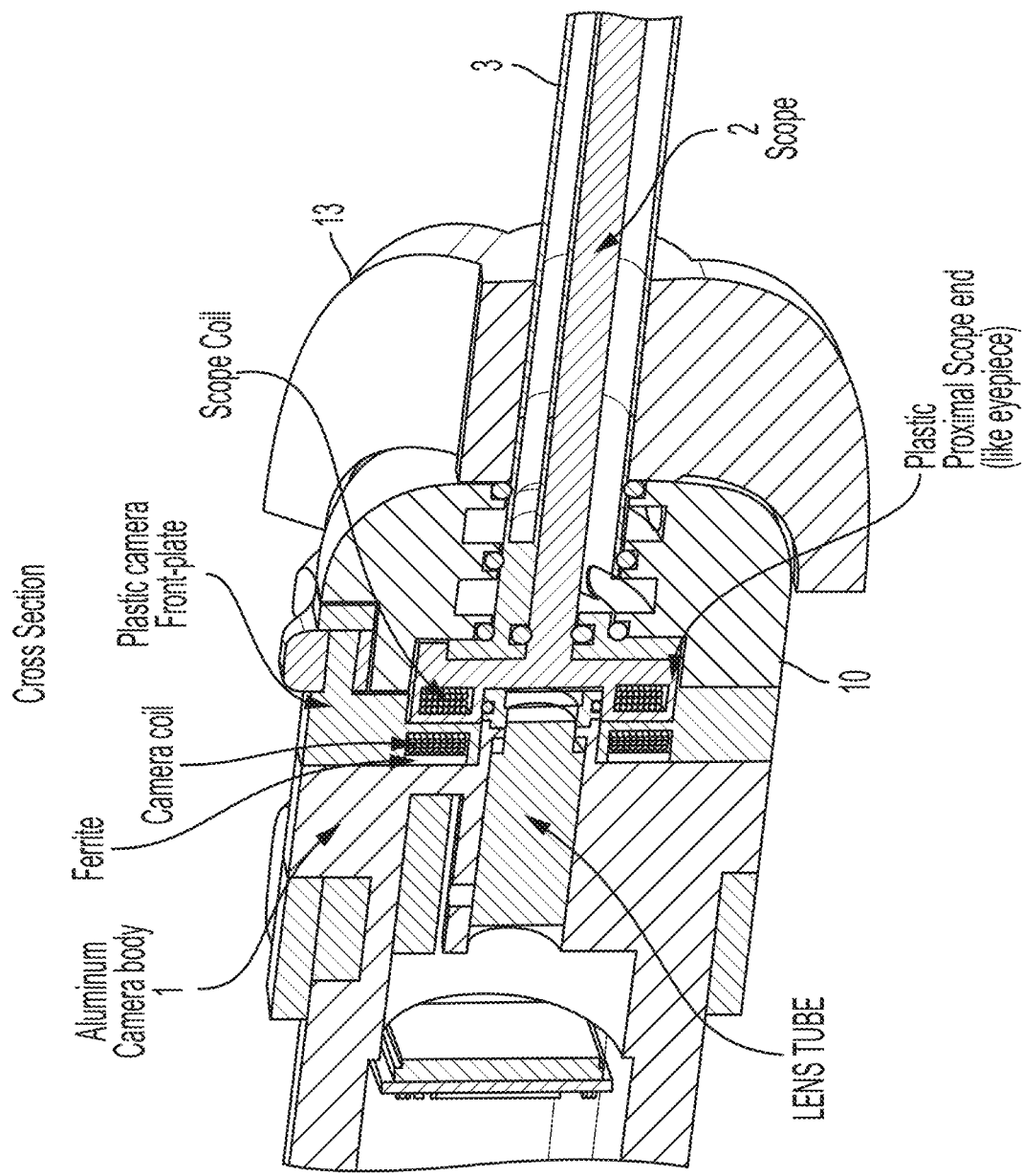
FIG. 9 illustrates an example of a cross section of a visualization system showing wireless power transfer between camera and scope in accordance with some embodiments disclosed herein.
Figure 10:
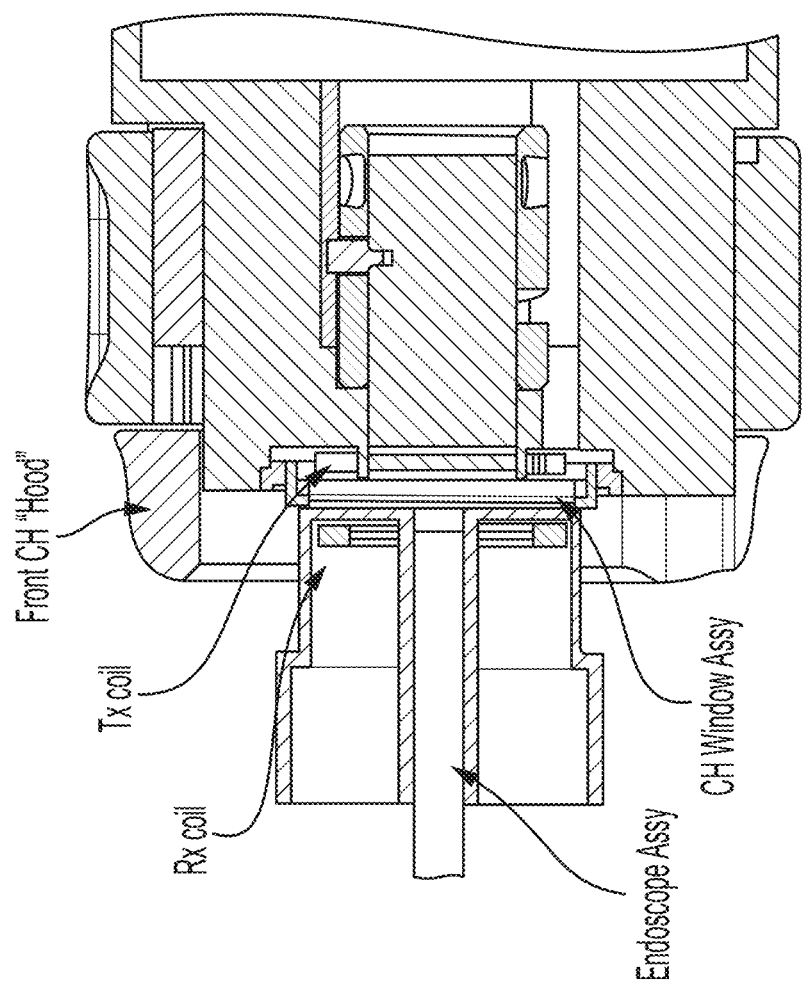
FIG. 10 illustrates another example of a cross section of a visualization system in accordance with some embodiments disclosed herein.
Figure 11:
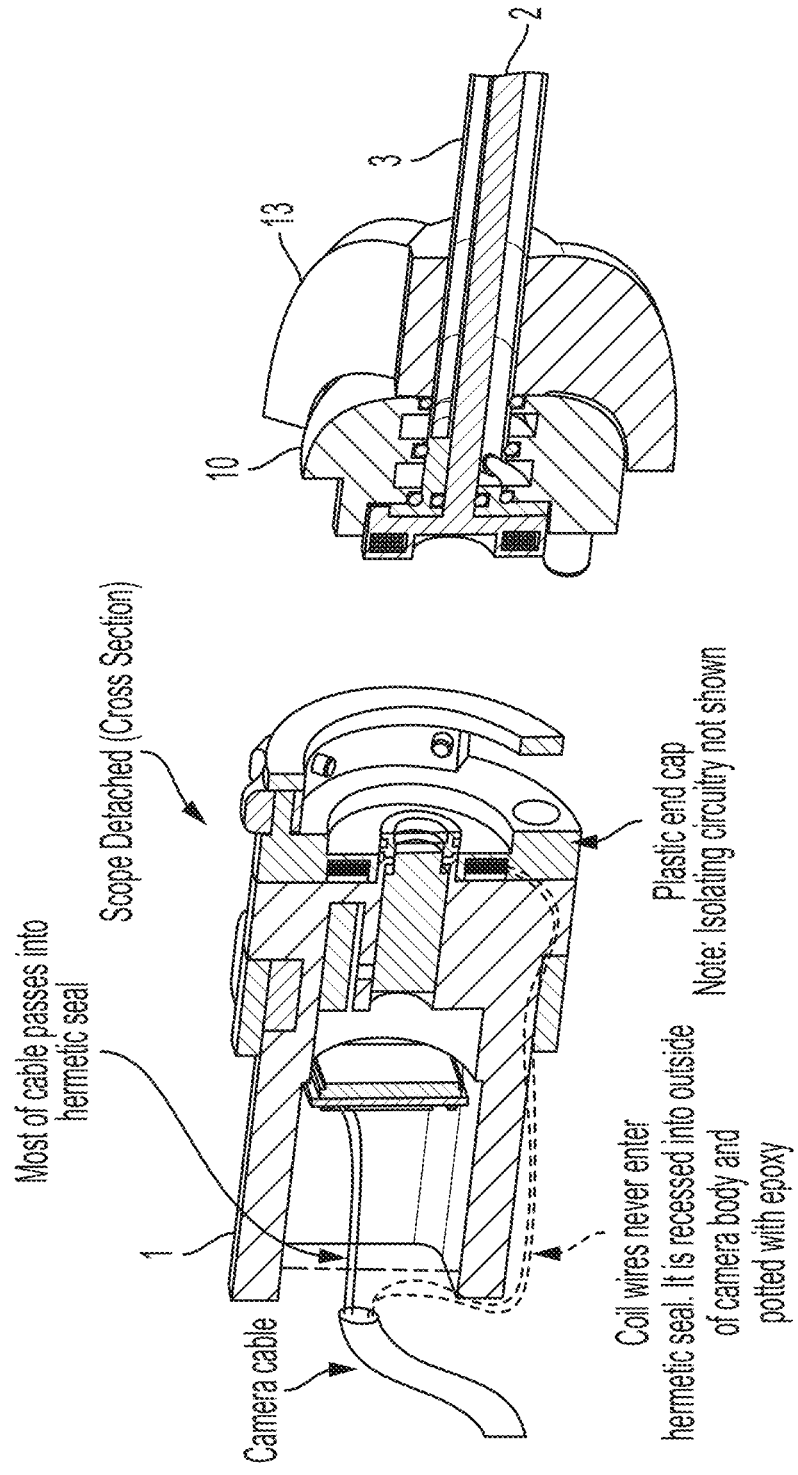
FIG. 11 illustrates an example of an exploded cross section of a visualization system in accordance with some embodiments disclosed herein.
Figure 12:
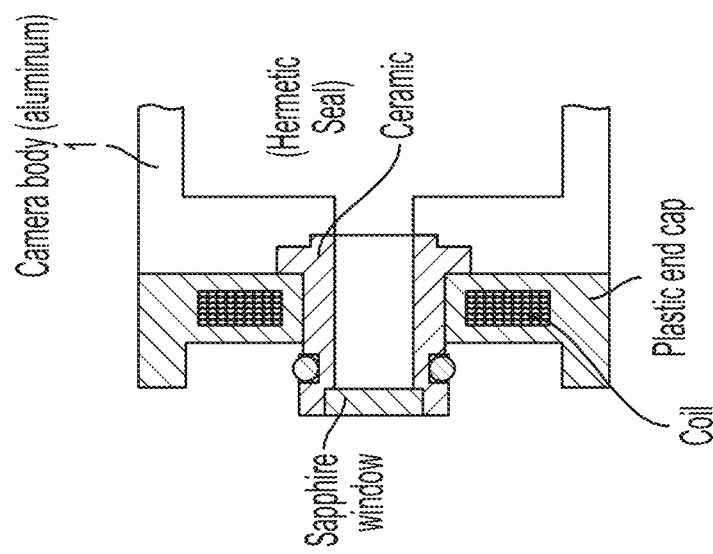
FIG. 12 illustrates an example of a cross section of a distal end of a camera of a visualization system in accordance with some embodiments disclosed herein.

FIG. 9 illustrates an example of wireless power transfer between the camera and the scope alongside space constraints of fluid management and scope fixing mechanisms. For example, FIGS. 9-13 show how coils for inductive coupling can be incorporated in the camera and the scope. The use of inductive coupling can limit the materials that can be used for the cannula, scope, and camera. In addition, the camera may have a camera front plate at the distal end of the camera and the scope may have a proximal scope end at its proximal end. Both the camera front plate and the proximal scope end can house coils for inductive coupling. In addition, both the camera front plate and the proximal scope end can be made of non-conductive material so as not to dissipate the inductive energy as eddy currents.

Figure 13:
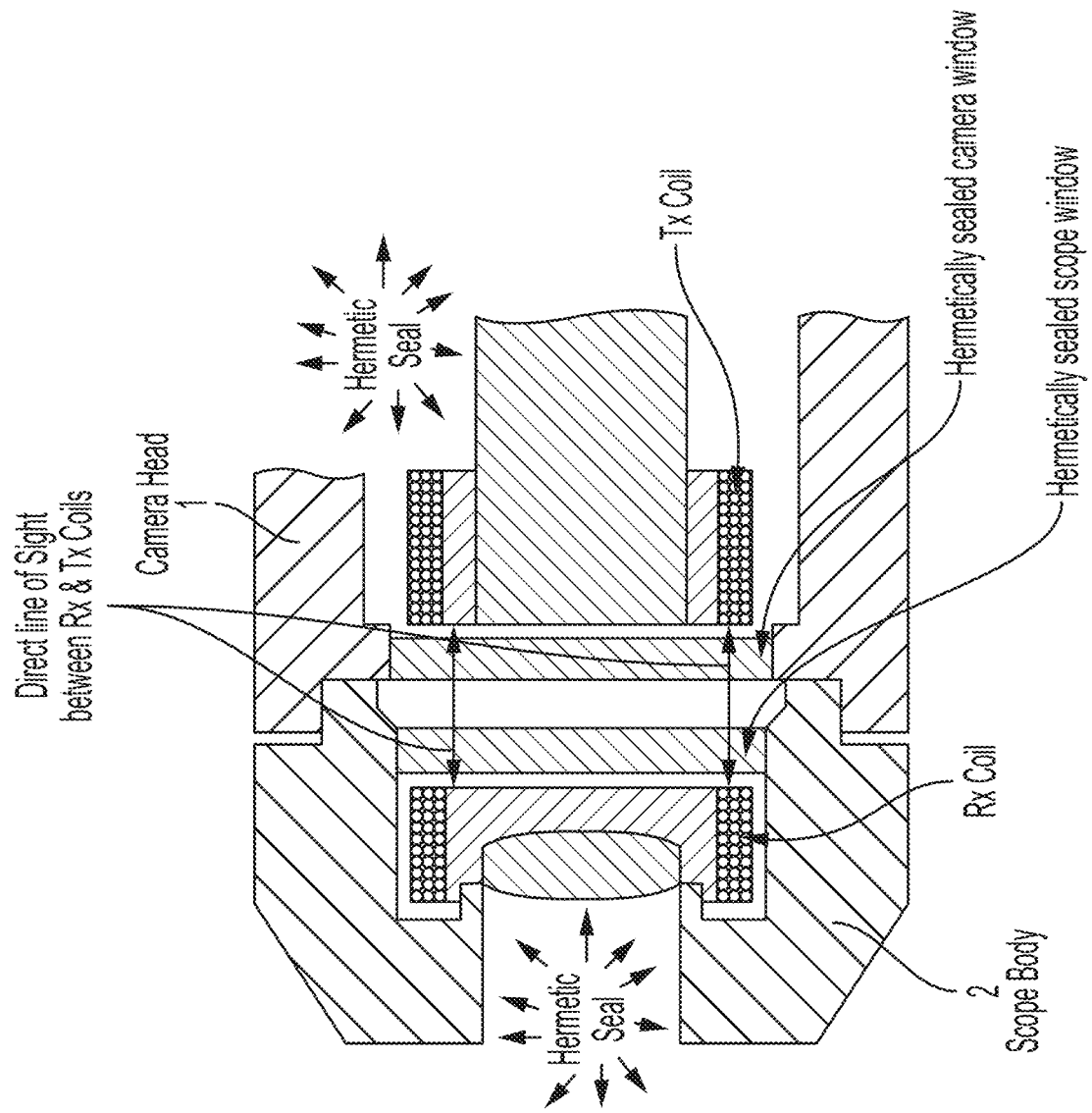
FIG. 13 illustrates another example of a cross section of a visualization system in accordance with some embodiments disclosed herein.
Figure 14B:
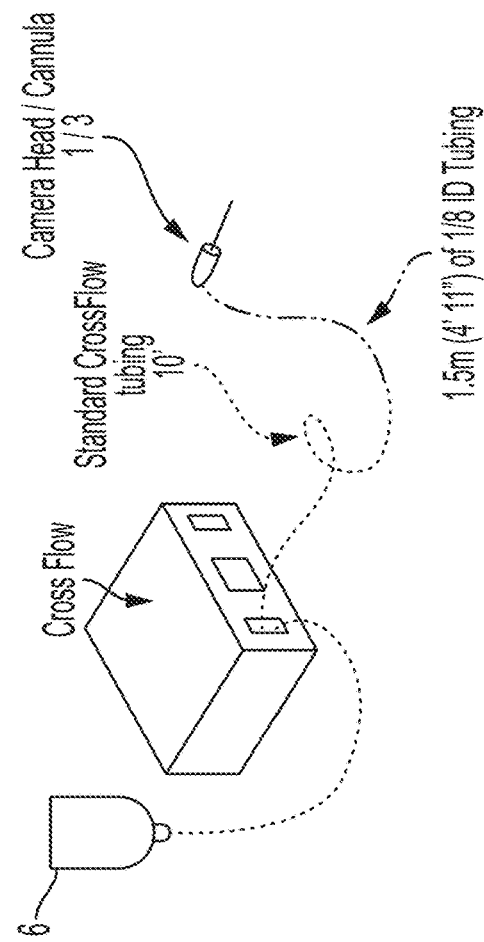
FIG. 14B illustrates an example of a fluid system connected to a visualization system in accordance with some embodiments disclosed herein.
Figure 14A:
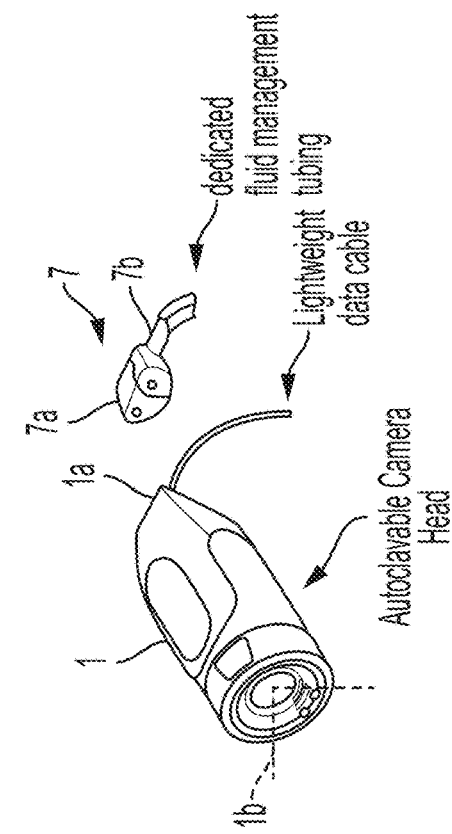
FIG. 14A illustrates an example of fluid and data connections to the camera of a visualization system in accordance with some embodiments disclosed herein.

In some embodiments, inductive coupling can be housed in a hermetically sealed section of the camera and scope as shown in FIG. 13. In some embodiments, inductive coupling can be potted behind a non-conductive plastic cap outside the hermetically sealed portion of the camera shown in FIGS. 11-12.

Figure 20A:
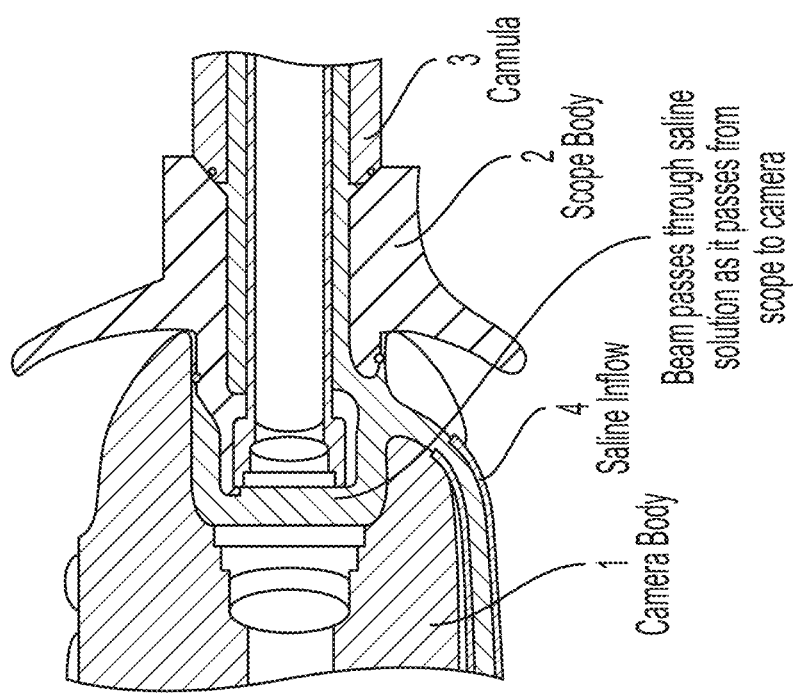
FIG. 20A illustrates an example of a cross section showing an anti-fogging concept during inflow of a visualization system in accordance with some embodiments disclosed herein.
Figure 20B:
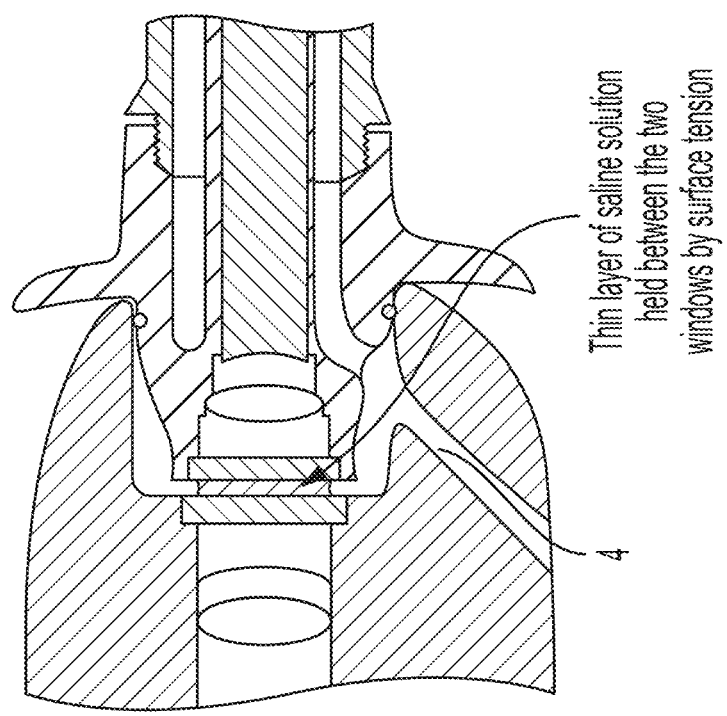
FIG. 20B illustrates an example of a cross section showing an anti-fogging concept with inflow off of a visualization system in accordance with some embodiments disclosed herein.

The visualization system can include an anti-fogging system as shown in FIGS. 20A-B. The anti-fogging system can be accomplished by filling the space between the scope and camera with clean saline solution. The clean saline can be flowed between the scope and camera windows of the system shown in these figures. In addition, hydroscopic coating or surface treatments can also help ensure fluid always remains in the space between these windows.

As described herein, the visualization systems can provide many advantages to a user during use. The user may use the visualization system by connecting fluid management tubing to a pump and to the rear of the camera. The scope with integrated illumination can be connected and an inflow/outflow cannula can be connected over the top of the scope. The distal tip of the cannula and scope can then be inserted into a patient and the user may turn on the fluid inflow and outflow to ensure a clear view inside the anatomy cavity. The user may steer the scope with their grip hand to rotate the DOV to assess the tissue and plan the surgery. In addition, the user may then perform the surgery by maneuvering around the anatomy and steering the DOV.

For the purpose of clarity and a concise description, features are described herein as part of the same or separate embodiments; however, it will be appreciated that the scope of the disclosure includes embodiments having combinations of all or some of the features described.

DEFINITIONS

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMS, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems can appear from the description above. In addition, the present disclosure is not described with reference to any particular programming language. It will be appreciated that a variety of programming languages may be used to implement the teachings of the present invention as described herein.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A visualization system for medical procedures comprising:
   a camera comprising a body longitudinally extending between a proximal end and a distal end and having a fluid inflow path, wherein the proximal end of the camera body is configured to fluidly connect a fluid reservoir to the fluid inflow path;
   a cannula comprising a lumen, wherein the lumen is configured to be fluidly connected to the fluid inflow path at the distal end of the camera body; and
   a scope, wherein the scope is configured to be connected to the distal end of the camera body and a portion of the scope is configured to be inserted into the lumen of the cannula, wherein the scope and cannula are configured to be rotatably connected to the distal end of the camera body and the scope and cannula are configured to rotate independent of the camera body.

2. The system of claim 1, wherein the scope comprises a light source.

3. The system of claim 1, wherein the camera comprises a light source.

4. The system of claim 1, wherein the scope is configured to be optically connected to the camera.

5. The system of claim 1, wherein the cannula comprises a fluid outlet at a distal end of the cannula fluidly connected to the lumen.

6. The system of claim 1, wherein the camera comprises a fluid outflow path and the proximal end of the camera body is configured to fluidly connect the fluid outflow path to a fluid waste.

7. The system of claim 1, wherein the cannula comprises a second lumen.

8. The system of claim 7, wherein the second lumen is configured to be fluidly connected to a fluid outflow path at the distal end of the camera body.

9. The system of claim 7, wherein the cannula comprises a non-permeable barrier separating the lumen from the second lumen.

10. The system of claim 7, wherein the lumen and the second lumen are parallel.

11. The system of claim 7, wherein the lumen and the second lumen are multi-lumens, not co-axial.

12. The system of claim 7, wherein the cannula comprises a fluid inlet between a proximal end and a distal end of the cannula fluidly connected to the second lumen.

13. The system of claim 7, wherein a cross sectional area of the second lumen and the lumen decreases from a proximal end of the cannula towards a distal end of the cannula.

14. The system of claim 7, further comprising a fluid manifold configured to be connected to the camera body and the cannula, wherein the fluid manifold fluidly couples the fluid inflow path of the camera body to the lumen and a fluid outflow path to the second lumen.

15. The system of claim 14, wherein the cannula is configured to be rotatably connected to the fluid manifold.

16. The system of claim 1, wherein the camera body, scope, and cannula are configured to be removeably connected from one another.

17. The system of claim 1, wherein the cannula comprises a cannula rotation guide on a proximal end of the cannula configured to rotate the cannula relative to the camera body.

18. The system of claim 17, wherein the cannula rotation guide is configured to rotate the cannula and the scope when the portion of the scope is inserted into the lumen of the cannula.

19. The system of claim 17, wherein the cannula rotation guide is configured to be positioned immediately distal the camera body when the scope and cannula are connected to the camera body.

20. The system of claim 1, wherein a diameter of the cannula tapers from a proximal end of the cannula towards a distal end of the cannula.

21. The system of claim 1, wherein a distal end of the cannula comprises a rounded tip.

22. The system of claim 21, wherein a portion of the rounded tip is configured to wrap around a portion of a distal end of the scope when the portion of the scope is inserted into the lumen of the cannula.

23. The system of claim 22, wherein the portion of the rounded tip is configured to wrap around a portion of the distal end of the scope without compromising or blocking illumination.

24. The system of claim 1, wherein the proximal end of the camera body is configured to be communicatively coupled to a data cable or wirelessly, communicatively coupled to a computer.

25. The system of claim 1, wherein the proximal end of the camera body is configured to be electrically coupled to a power cable or wirelessly, electrically coupled to a power source.

26. The system of claim 1, wherein the scope and camera are configured to be wirelessly, electrically coupled to one another.

27. The system of claim 25, wherein the scope and camera are configured to be wirelessly, electrically coupled to one another via inductive coupling.

28. A visualization system for medical procedures comprising:
   a camera comprising a body longitudinally extending between a proximal end and a distal end and having a fluid inflow path and a fluid outflow path, wherein the proximal end of the camera body is configured to fluidly connect a fluid reservoir to the fluid inflow path and the fluid outflow path to a fluid waste;
   a cannula comprising a first and a second lumen, wherein the first lumen is configured to be fluidly connected to the fluid inflow path at the distal end of the camera body and the second lumen is configured to be fluidly connected to the fluid outflow path at the distal end of the camera body; and
   a scope, wherein the scope is configured to be connected to the distal end of the camera body and a portion of the scope is configured to be inserted into the first or second lumen of the cannula, wherein the scope and cannula are configured to be rotatably connected to the distal end of the camera body and the scope and cannula are configured to rotate independent of the camera body.

29. A visualization system for medical procedures comprising:
   a camera comprising a body longitudinally extending between a proximal end and a distal end and having a fluid inflow path, wherein the proximal end of the camera body is configured to fluidly connect a fluid reservoir to the fluid inflow path;
   a cannula comprising a lumen, wherein the lumen is configured to be fluidly connected to the fluid inflow path at the distal end of the camera body; and
   a scope, wherein the scope is configured to be connected to and wirelessly, electrically coupled to the distal end of the camera body and a portion of the scope is configured to be inserted into the lumen of the cannula, wherein the scope and cannula are configured to be rotatably connected to the distal end of the camera body and the scope and cannula are configured to rotate independent of the camera body.

30. A visualization system for medical procedures comprising:
   a camera comprising a body longitudinally extending between a proximal end and a distal end and having a fluid inflow path, wherein the proximal end of the camera body is configured to fluidly connect a fluid reservoir to the fluid inflow path;
   a cannula comprising a lumen, wherein the lumen is configured to be fluidly connected to the fluid inflow path at the distal end of the camera body and a diameter of the cannula tapers from a proximal end of the cannula towards a distal end of the cannula; and
   a scope, wherein the scope is configured to be connected to the distal end of the camera body and a portion of the scope is configured to be inserted into the lumen of the cannula, wherein the scope and cannula are configured to be rotatably connected to the distal end of the camera body and the scope and cannula are configured to rotate independent of the camera body.

31. A visualization system for medical procedures comprising:
   a camera comprising a body longitudinally extending between a proximal end and a distal end and having a fluid inflow path, wherein the proximal end of the camera body is configured to fluidly connect a fluid reservoir to the fluid inflow path;
   a cannula comprising a lumen and an integrated rotation guide, wherein the lumen is configured to be fluidly connected to the fluid inflow path at the distal end of the camera body; and
   a scope, wherein the scope is configured to be connected to the distal end of the camera body and a portion of the scope is configured to be inserted into the lumen of the cannula, and wherein the rotation guide is located on a proximal end of the cannula and configured to be positioned immediately distal the distal end of the camera body when the scope and cannula are connected to the camera body, wherein the scope and cannula are configured to be rotatably connected to the distal end of the camera body and the scope and cannula are configured to rotate independent of the camera body.

* * * * *